(12) United States Patent
Zinn

(10) Patent No.: US 12,514,874 B2
(45) Date of Patent: *Jan. 6, 2026

(54) ANTISEPTIC APPLICATIONS OF METAL NANOPARTICLE AGGLOMERATES

(71) Applicant: KUPRION INC., San Jose, CA (US)

(72) Inventor: Alfred A. Zinn, Palo Alto, CA (US)

(73) Assignee: Kuprion Inc., Waterbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/637,104

(22) PCT Filed: Aug. 3, 2021

(86) PCT No.: PCT/US2021/044250
§ 371 (c)(1),
(2) Date: Feb. 22, 2022

(87) PCT Pub. No.: WO2022/031637
PCT Pub. Date: Feb. 10, 2022

(65) Prior Publication Data
US 2023/0149454 A1    May 18, 2023

Related U.S. Application Data

(60) Provisional application No. 63/060,739, filed on Aug. 4, 2020.

(51) Int. Cl.
*A61K 33/38* (2006.01)
*A61K 33/34* (2006.01)
(Continued)

(52) U.S. Cl.
CPC ............. *A61K 33/38* (2013.01); *A61K 33/34* (2013.01); *A61P 31/04* (2018.01); *A61P 31/16* (2018.01); *B82Y 5/00* (2013.01)

(58) Field of Classification Search
CPC .................................................. A61K 33/00
See application file for complete search history.

(56) References Cited

U.S. PATENT DOCUMENTS

| 7,736,414 B1 | 6/2010 | Zinn |
| 8,105,414 B2 | 1/2012 | Zinn |

(Continued)

FOREIGN PATENT DOCUMENTS

| CN | 1306117 A | * | 1/2001 |
| JP | 6155543 | * | 3/2012 |

(Continued)

OTHER PUBLICATIONS

Yu et al. Remarkably Improvement in Antibacterial Activity by Synergistic Effect in n—Cu@T—ZnO nanocomposites. Sep. 2016.*
(Continued)

*Primary Examiner* — Sarah Alawadi
(74) *Attorney, Agent, or Firm* — Carmody Torrance Sandak & Hennessey LLP

(57) ABSTRACT

Metal nanoparticle agglomerates in various forms may be utilized to promote infection control. Antiseptic substrates may comprise a base substrate and metal nanoparticle agglomerates adhered thereto. Metal nanoparticle agglomerates upon the antiseptic substrates may be contacted with a skin penetration, a skin injury, a burn, a site to be subjected to a skin penetration, or an active skin infection to provide infection control against at least one infective agent. The antiseptic substrates may also facilitate water purification in some cases. Antiseptic fluid formulations comprising a fluid medium having metal nanoparticle agglomerates dispersed therein may be configured for topical or oral use and may similarly afford infection control. Creams, ointments, balms, salves, gels, and liquids or liquid suspensions containing metal nanoparticle agglomerates may be effective for pro-
(Continued)

moting infection control and/or for treating an active infection.

14 Claims, 5 Drawing Sheets

(51) Int. Cl.
*A61P 31/04* (2006.01)
*A61P 31/16* (2006.01)
*B82Y 5/00* (2011.01)

(56) References Cited

U.S. PATENT DOCUMENTS

| | | |
|---|---|---|
| 8,192,866 B2 | 6/2012 | Golightly et al. |
| 8,486,305 B2 | 7/2013 | Zinn et al. |
| 8,834,747 B2 | 9/2014 | Zinn |
| 9,005,483 B2 | 4/2015 | Zinn et al. |
| 9,095,898 B2 | 8/2015 | Zinn |
| 9,700,940 B2 | 7/2017 | Zinn |
| 2015/0290354 A1* | 10/2015 | Loboa ............... A61L 15/26 424/618 |
| 2016/0201183 A1* | 7/2016 | Zinn ............... C23C 24/106 428/209 |
| 2016/0287631 A1 | 10/2016 | Tarbet et al. |
| 2018/0133124 A1 | 5/2018 | Bechert et al. |
| 2018/0325943 A1* | 11/2018 | Loitner ............... A61L 17/145 |
| 2019/0040497 A1* | 2/2019 | Yushin ............... C22C 3/005 |
| 2019/0242064 A1* | 8/2019 | Dankovich ............... C02F 1/50 |

FOREIGN PATENT DOCUMENTS

| | | | |
|---|---|---|---|
| JP | 2020059706 A | | 4/2020 |
| TW | 201632072 A | * | 9/2016 |
| WO | 2016115237 A1 | | 7/2016 |
| WO | 2016122995 A1 | | 8/2016 |

OTHER PUBLICATIONS

Alizadeh et al. Copper Nanoparticles promote rapid wound healing in acute full thickness defect via acceleration of skin cell migration, proliferation, and neovascularization. (Year: 2019).*
International Search Report and Written Opinion for corresponding PCT/US2021/044250, dated Dec. 20, 2021.
Verma, A., et al., "Metal nanoparticle based antibacterial nanocomposites for skin infections," Nanotechnology in Skin, Soft Tissue, and Bone Infections, 2020, pp. 25-48.
Nigussie G.B., et al., "Antibacterial activity of Ag-doped TiO2 and Ag-doped ZnO Nanoparticles," International Journal of Photoenergy, 2018, 5927485 (7 pp.).

* cited by examiner

ANTISEPTIC APPLICATIONS OF METAL NANOPARTICLE AGGLOMERATES

BACKGROUND

The world is facing increasing threats from antibiotic-resistant strains of bacteria (i.e., "super bugs") that cannot be effectively treated due, at least in part, to the overuse of antibiotics. Other types of resistant microorganisms can present similar issues. Increased population densities and efficient mass transit infrastructure have also contributed significantly to both localized and global spread of both common and emerging diseases. Common influenza and emerging viruses such as coronaviruses represent a significant health threat in this respect. Even common bacterial and viral infections may present serious health risks if effective infection controls are not practiced or if active infections are not effectively managed.

In some instances, infection control procedures may be ineffective or impractical, such as at a job site or in a remote environment. By the time a person reaches a medical facility for treating a wound, burn, or similar skin penetration or skin injury, it may be too late. Infection may have already set in, especially when the skin penetration or skin injury is received in an unsterile environment to begin with (e.g., a soldier in a battlefield or a camper at a remote camp site). Common infective agents present natively present upon skin may become exceedingly problematic when they become established in a skin penetration or skin injury. First aid kits typically contain agents for disinfecting minor skin injuries to suppress infection, but they may not be completely effective in some instances. Sometimes, more aggressive treatment to prevent infection is subsequently needed once the initial trauma of a skin injury has been stabilized. Moreover, first aid kits do not typically contain agents suitable for addressing more aggressive infective agents. As such, infections arising from skin injury and routine skin penetrations continue to be problematic. Oral infections may present similar issues.

Topical infections occurring without an injury to the skin or other root cause are also frequently encountered. Such skin infections may be bacterial or viral in nature and may present as a skin lesion. Acne, chicken pox, shingles, and warts are but several examples of such skin infections. Canker sores and other oral lesions are also examples of topical infections that may be frequently encountered. Rather than proactively disinfecting a skin surface to prevent a topical infection, attention may turn toward therapeutic approaches for treating the topical infection (e.g., limiting spread, decreasing the amount of time a topical infection is present, lessening pain from a topical infection, and the like).

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
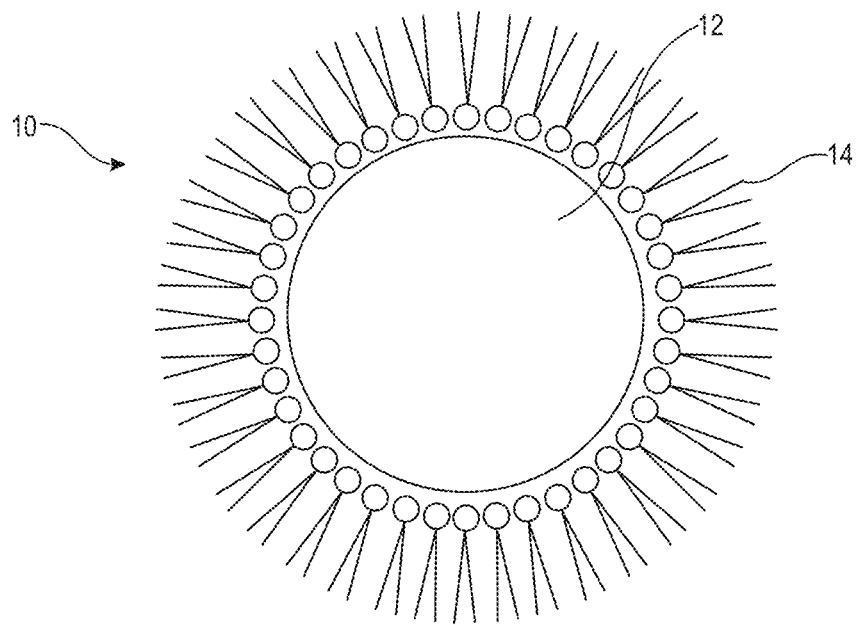
FIGS. 1 and 2 show diagrams of presumed structures of metal nanoparticles having a surfactant coating thereon.

The present disclosure relates to metal nanoparticle constructs for providing infection control at a skin surface, including within an oral cavity, against one or more infective agents, such as viruses and bacteria, particularly those that may be introduced through a skin penetration or similar skin injury (wound), burn, or those that are symptomatically present upon the skin, including those presenting as topical skin infections. Infection control may include treatment of an active infection and/or an intervention upon a skin surface to decrease the likelihood of an active infection from occurring.

The metal nanoparticle constructs include disinfection media of various types that comprise metal nanoparticle agglomerates, which may be effective for lessening the likelihood of an infection occurring and/or for addressing an active infection. Surprisingly, metal nanoparticle agglomerates may be more active for promoting infection control than are individual metal nanoparticles, and metal nanoparticle agglomerates may provide further practical advantages as well, as discussed herein. Metal nanoparticle agglomerates may be incorporated in products of various types to provide disinfection capabilities, which may be referred to herein as "disinfection media" of various types. Disinfection media may include metal nanoparticle agglomerates adhered to a base substrate or fluid disinfection media containing metal nanoparticle agglomerates dispersed in a suitable fluid medium. Either type of disinfection media may be suitable for promoting infection control at a skin surface subject to infection, as discussed further herein.

Disinfection media comprising a base substrate having metal nanoparticle agglomerates adhered thereto may be configured for temporary or prolonged contact with a skin surface. For example, dressings, bandages, wipes, medical packing, and the like comprising metal nanoparticle agglomerates adhered to a base substrate may provide infection control against one or more infective agents by inactivating the infective agents and precluding them from becoming established in a wound, burn or similar compromised point of skin entry. Dressings and bandages having metal nanoparticle agglomerates adhered thereto may afford infection control during prolonged exposure to a skin surface while healing is taking place. Wet or dry wipes having metal nanoparticle agglomerates adhered thereto may similarly sterilize a skin surface before a skin penetration occurs (e.g., during surgery or an injection), or after a wound, burn, or similar skin injury has been received. Wet or dry wipes having metal nanoparticle agglomerates adhered thereto may also sterilize other types of surfaces as well. Disinfection media having metal nanoparticle agglomerates bound to a base substrate may also be useful for treating topical skin infections such as warts, cold sores, acne, and the like. A patch or bandage containing adhered metal nanoparticle agglomerates may be contacted with the topical skin infections to promote treatment thereof. Non-limiting examples of other types of products comprising metal nanoparticle agglomerates adhered to a base substrate are provided below.

Fluid disinfection media may comprise metal nanoparticle agglomerates dispersed in a suitable fluid medium. The fluid medium may be biologically compatible and suitable for contacting a skin surface and/or for oral (periodontal) use. For example, the metal nanoparticle agglomerates may promote skin disinfection prior to surgery, whereas aggressive chemical disinfectants may presently be used for this purpose. Disinfection creams, ointments, liquids, gels, salves, liquids, liquid suspensions, and the like containing metal nanoparticle agglomerates may similarly provide disinfection before or after a wound, burn, or similar skin injury has been received. Such fluid disinfection media comprising metal nanoparticle agglomerates may afford infection control against infective agents that are natively present upon the skin and/or against those that are introduced from environmental sources when a wound, burn, or similar skin injury is present and inadequately protected. Similarly, fluid disinfection media comprising metal nanoparticle agglomerates may be utilized for treating topical skin infections as well, such as acne, chicken pox, shingles, warts, and the like, wherein the fluid disinfection media may be applied to the topical skin infection by directly spraying, rubbing, or pouring the fluid disinfection media upon a site of topical infection.

Silver and copper surfaces possess antibacterial activity, even against antibiotic-resistant bacteria in some instances. In addition, bulk copper surfaces are capable of inactivating some viruses, such as coronaviruses, albeit rather slowly (hours of surface contact time). Coronaviruses and other pathogens may remain active for up to five days on various types of surfaces lacking inherent antiseptic activity, such as glass, polymers, ceramics, rubber, paper, cardboard, and stainless steel, for example. Unfortunately, it is difficult to incorporate metallic silver or metallic copper upon various types of surfaces due to the high melting point of these metals. Molten copper, for instance, forms at the melting point of copper (1083° C.), a temperature which is completely incompatible with the base materials present in many of these surface types. The melting point of silver is likewise problematically high. Micron-size silver or copper particles or flakes may be produced, but it may be difficult to promote adherence of the particles or flakes to a base substrate to maintain the metal in place during use and to afford robust performance. In addition, it may be difficult to formulate micron-size metal particles or flakes into a form suitable for rapid dispensation upon a base substrate. Even more significantly, bulk metal surfaces of these types may afford limited ability to promote infection control through contact with a skin surface (e.g., in proximity to a skin penetration or skin injury).

Metal nanoparticle agglomerates are uniquely situated to address the foregoing difficulties and provide further advantages over both bulk metal surfaces and individual metal nanoparticles, since they may rapidly inactivate a range of microorganisms and viruses, including coronaviruses, and are low toxicity to humans, especially in small amounts. When applied topically to a skin surface according to the disclosure herein, there is an even lower risk of potential intake in vivo. The biocidal activity of metal nanoparticle agglomerates may be maintained both when the metal nanoparticle agglomerates are adhered to a base substrate and when the metal nanoparticle agglomerates are distributed in a suitable fluid medium, thereby affording a wealth of disinfection media of various types that may be useful for a range of situations where topical infections may be problematic. As discussed further below, metal nanoparticle agglomerates may advantageously convey a time-release profile of active metal (e.g., as individual metal nanoparticles or smaller nanoparticle agglomerates) to a site of infection or potential infection, while also limiting toxicity toward mammalian cells by minimizing release of free metal nanoparticles in vivo. Further tailoring of the time-release profile may be realized by adhering metal nanoparticle agglomerates to a base substrate with a suitable adhesive. As such, long-lasting infection control over a range of times may be realized for various types of disinfection media.

Copper may be an advantageous metal to incorporate in metal nanoparticle agglomerates used for the foregoing purposes and others. Copper is an essential micronutrient that may stimulate the proliferation and migration of endothelial cells, prompt new blood vessel growth (neovascularization), and promote wound healing. Human cells also contain natural copper receptors. As a result, wound healing may be promoted more readily in the presence of copper compared to when copper is absent or when alternative metals such as silver are used, although silver may also be effective for promoting disinfection in the disclosure herein. Wound healing promoted by copper may include, for example, new blood vessel growth, generation of new hair follicles and sebaceous glands, and fibroplasia, without occurrence of precancerous changes or other atypia.

Copper is also involved in numerous physiological and metabolic processes in the human body. In the skin, copper is involved in the synthesis and stabilization of extracellular matrix skin proteins and angiogenesis. Therefore, methods of the present disclosure employing copper nanoparticle agglomerates may improve the well-being of the skin. Without limitation, improving the well-being of skin may include, for example, addressing athlete's foot and other fungal infections and improving in skin elasticity, especially important for individuals suffering from diabetes; reducing facial fine lines and wrinkles; and enhancing wound healing in garments and fabrics contacting the skin and containing copper nanoparticle agglomerates, such as socks, pillowcases and wound dressings. In the skin, copper may stimulate dermal fibroblast proliferation; up-regulate collagen (types I, II, and V) and elastin fiber components (elastin and fibrillins) production by fibroblasts, possibly through induction of TGF-β; stimulate HSP-47 to promote collagen fibril formation; serve as a cofactor of LOX to promote efficient ECM protein cross-linking; stabilize the skin ECM once formed (increased crosslinking of collagen and elastin matrices occurs in a copper dose dependant manner); serve as a cofactor of superoxide dismutase, an antioxidant enzyme present in the skin, that may provide protection against free radicals; inhibit cellular oxidative effects such as membrane damage and lipid peroxidation; and serve as a cofactor of tyrosinase, a melanin biosynthesis enzyme responsible for skin and hair pigmentation.

Accordingly, the present disclosure provides various approaches for mitigating infections originating at wound, burn or similar location upon a skin surface and/or inactivating infective agents already present upon a skin surface, such as a topical infection. In particular, infection control methods of the present disclosure may comprise containing a plurality of metal nanoparticle agglomerates with a skin surface (including the oral cavity), and inactivating at least one infective agent with the metal nanoparticle agglomerates while contacting the skin surface. The metal nanoparticle agglomerates may promote wound healing in this capacity.

Various types of disinfection media containing metal nanoparticle agglomerates, including metal nanoparticle agglomerates adhered to a base substrate or dispersed in a fluid medium, may be utilized to provide infection control prior to receiving a skin penetration or after a burn, wound, skin penetration or similar skin injury has been received. Wound dressings, medical packing, bandages and the like containing metal nanoparticle agglomerates adhered to a base substrate may be utilized to limit contamination of an existing wound during the healing process or to protect a wound from infection until more thorough medical attention can be received. Fluid disinfection media comprising metal nanoparticle agglomerates in a fluid dispersion may afford similar capabilities in this regard. As such, the present disclosure provides a range approaches for mitigating or preventing infection within a wound, burn, skin penetration or similar skin injury by inactivating an infective agent up a skin surface, either before or after the infective agent has reached the wound, burn, skin penetration, or similar skin injury. Topical infections upon a skin surface (including those not having an accompanying skin injury) may also be addressed using the various types of disinfection media disclosed herein as well. Biofilms upon a skin surface or elsewhere may also be addressed through the disclosure herein.

As a further advantage, metal nanoparticle agglomerates may be readily processed into spray formulations and dip coating formulations that facilitate their ready dispensation onto base substrates such as dressings and similar media to convey antiseptic activity thereto for promoting infection control according to the disclosure herein. The terms "biocidal" and "antiseptic" may be used synonymously herein to the process of killing or inactivating at least one infective agent. As used herein, the term "spray formulation" and similar terms refer to an aerosolizable fluid comprising metal nanoparticle agglomerates that may be aerosolized in small droplet form. Once deposited upon the surface of a base substrate, such as with a suitable spray formulation, the metal nanoparticle agglomerates may become robustly adhered thereto as a consequence of their high surface energy, as discussed further herein.

Some spray formulations may also be suitable to deposit metal nanoparticle agglomerates directly upon a skin surface to provide infection control, such as within a spray bandage to protect a wound, burn, or similar skin penetration from becoming infected, for example. Spray formulations comprising metal nanoparticle agglomerates may similarly be utilized to treat topical infections such as acne, warts, shingles, chicken pox, herpes, measles, roseola, fifth disease, chikungunya, staph, viral tick infections (such as lyme disease), and the like. Antiseptic fluid formulations containing metal nanoparticle agglomerates dispersed in a fluid medium may alternately be poured or wiped upon a skin surface to provide similar effects. Some antiseptic fluid formulations suitable for pouring or wiping upon a skin surface may also be suitable for spray disposition by mechanical pumping. Example antiseptic fluid formulations may include "liquid skin" or liquid bandage formulations that form a film over a site of injury or infection. Other antiseptic fluid formulations may include those that proactively address at least one infective agent. In some cases, antiseptic fluid formulations may comprise a cyanoacrylate resin or similar adhesive to hold metal nanoparticle agglomerates in place upon a skin surface in proximity to a site of potential infection without being released in free form in vivo. Such adhesive may provide similar benefits to those holding metal nanoparticle agglomerates in place on a base substrate, as discussed further herein.

Without being bound by any theory, the mechanism of action of metal nanoparticle agglomerates against various infective agents may result from interaction of a biomolecule with metal nanoparticles contained in the metal nanoparticle agglomerates. The mechanism of action may be similar to that of platinum coordination compounds (e.g., cisplatin, carboplatin, oxaliplatin, and pyriplatin). Advantageously, the mechanism of action of metal nanoparticles may address mutations and antibiotic resistance that are becoming increasingly frequent with common disinfectants and pharmaceuticals. Whereas these conventional agents may function through competitive inhibition, metal nanoparticles may facilitate multiple biocidel pathways and lead to more effective biocidel activity that is more resistant to mutations. The metal nanoparticle agglomerates are believed to release metal in a more active form than if individual metal nanoparticles were incorporated directly upon a surface subject to infection, as discussed further herein.

Advantageously, disinfection media comprising metal nanoparticle agglomerates, either adhered to a base substrate or dispersed of various types or dispersed in a suitable fluid medium, may be readily stored in first aid kits to facilitate a rapid response to a potential infection-causing event. For example, cloth bandages, liquid bandages, wraps, sprays, gels, ointments or the like from a first aid kit may be applied to triage a wound to prevent infection from occurring until more thorough medical treatment can be received (including treatment using metal nanoparticle agglomerates), or such disinfection media may be used to provide ongoing infection control throughout a wound-healing process. Wipes containing metal nanoparticle agglomerates may similarly aid in disinfecting a skin surface, either before or after a skin injury has been received (e.g., an injection or incision), and are likewise readily storable in a first aid kit. For example, wipes containing adhered metal nanoparticle agglomerates may be utilized to disinfect a skin surface prior to performing an injection or making an incision, much as how alcohol wipes are conventionally used. When stored in a sealed bag or similar packaging, particularly under inert atmosphere, the shelf life of such disinfection media may be measured in years, which may particularly beneficial for incorporation of the disinfection media in first aid kits. Dressings, liquid disinfection media, and the like containing metal nanoparticle agglomerates may similarly be stockpiled in other medical settings as well for dispensation on an as-needed basis (e.g., in a doctor's office, pharmacy, hospital, freestanding emergency clinic, retail store, or the like).

Metal nanoparticle agglomerates may be incorporated during manufacturing upon dressings, wipes and other types of base substrates suitable for providing infection control according to the disclosure herein. Advantageously, incorporation of metal nanoparticle agglomerates upon such base substrates may be readily incorporated in existing production lines. Alternately, metal nanoparticle agglomerates may be incorporated after manufacturing by dipping or spraying a formulation comprising metal nanoparticle agglomerates upon a base substrate otherwise lacking biocidal activity. In either case, metal nanoparticle agglomerates may be incorporated in an amount sufficient to inactivate at least one infective agent, such as at least one type of virus or bacteria.

Figure 7:
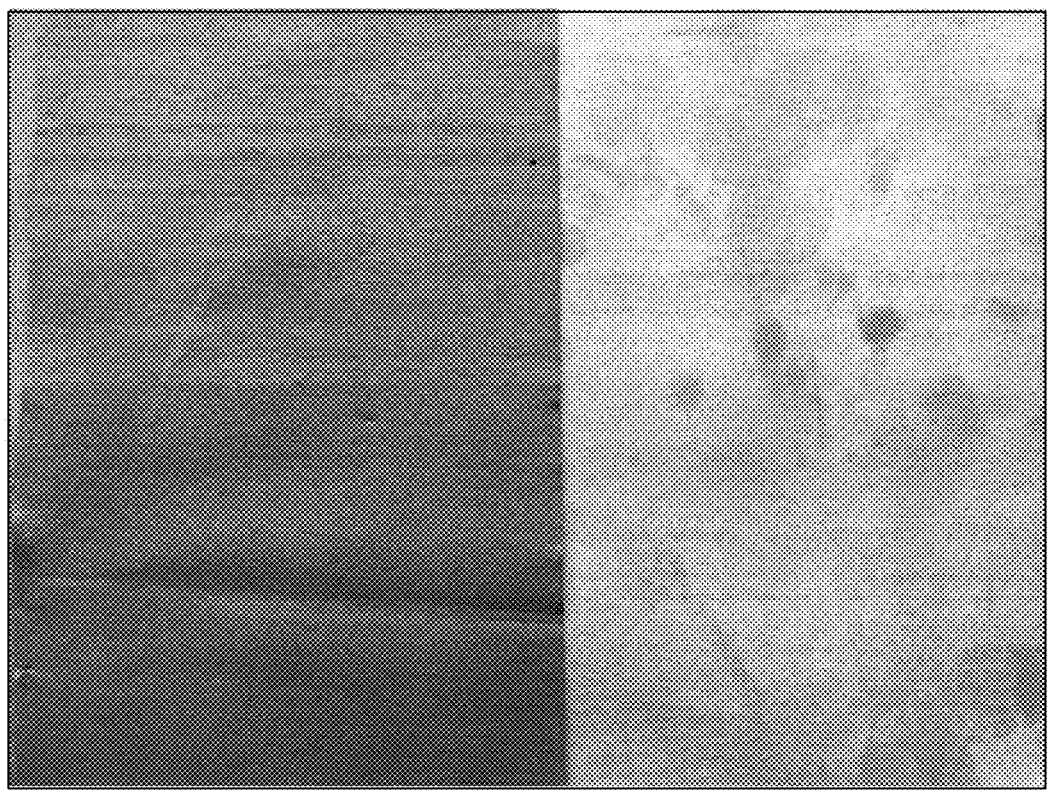
FIG. 7 shows an illustrative photographic image of a fabric having agglomerates of copper nanoparticles adhered thereto, as fabricated (left side of image) and after extended use (right side of image).

Bandages, cotton swabs, gauze, wraps, and the like having metal nanoparticle agglomerates adhered thereon may be contacted with a potential or active site of infection upon a skin surface to afford direct benefits of providing infection control through limiting the occurrence of new infections or addressing an existing infection. Advantageously, such base substrates and other surfaces having adhered metal nanoparticle agglomerates may undergo a color change as oxidation and/or breakup of the metal nanoparticle agglomerates occurs (provided there is sufficient contrast with a surface upon which the metal nanoparticle agglomerates are deposited), which may provide some indication of loss of biocidal potency. For example, FIG. 7 shows an illustrative photographic image of a fabric having agglomerates of copper nanoparticles adhered thereto, as fabricated (left side of image) and after extended use (right side of image).

Metal nanoparticle agglomerates may exhibit good substrate adherence by themselves as a consequence of their high surface energy and surfactant coating, as discussed further below, and adherence may be further supplemented by an adhesive. The adhesive may permit a highly reactive and mobile form of active metal to be obtained on a base substrate. The adhesive may further aid in promoting a time-release profile of metal nanoparticle agglomerates, as discussed further below, thereby allowing long-lasting infection control to be realized.

Metal nanoparticles and their agglomerates, properties of which are addressed in further detail below, represent a highly reactive metal form that may undergo ready adherence to a range of base substrates (e.g., by spraying, brush on coating, or dip coating), such as natural and synthetic fibers, polymer films, textiles, cardboard, paper, and the like, after being deposited in small droplet form thereon. Particularly suitable base substrates for use in the disclosure herein may comprise polymer fibers, textile fibers, cellulosic fibers, or any combination thereof. Once deposited upon a base substrate and firmly adhered thereto, the metal nanoparticle agglomerates may contact a skin penetration, wound site, burn, or the like, or a site of ongoing topical infection upon a skin surface to convey infection control thereto.

Through the disclosure herein, new infections may be suppressed by inactivating an infective agent with metal nanoparticle agglomerates before the infective agent can become established at a wound site, burn, skin penetration, or the like. Existing or established infections may be treated by contacting a wound site, burn, skin penetration, or the like, including topical infections, with metal nanoparticle agglomerates for a sufficient time to permit inactivation of an infective agent to take place. In either case, metal nanoparticle agglomerates may remain adhered to a base substrate in agglomerate form, and only minute quantities of individual metal nanoparticles or small metal nanoparticle agglomerates, at most, may be released to a site of infection or potential infection to allow inactivation to take place. This approach may limit mammalian toxicity while still providing a sufficient amount of active metal to promote inactivation of an infective agent. Similar benefits may be realized with fluid formulations comprising metal nanoparticle agglomerates as well.

Metal nanoparticles within metal nanoparticle agglomerates may become firmly adhered to a base substrate as their surfactant coating is removed, as discussed further below, and the strength of adherence may be further supplemented with an adhesive, if needed. In the case of polymer substrates, additional substrate adherence may be realized by heating the substrate up to a softening point thereof, such that the metal nanoparticle agglomerates become at least partially embedded in the base substrate (e.g., upon polymer fibers).

Metal nanoparticles, such as silver and copper nanoparticles, can be readily produced in a size range that is compatible for processing into spray formulations and other fluid media that may be suitable for deposition upon a range of base substrates or used directly for promoting contact of metal nanoparticle agglomerates with an infective agent or a site of potential infection. The small size of the metal nanoparticles and agglomerates thereof allows ready dispersion in a fluid medium to be realized and aerosolized droplet formation to take place therefrom. In addition, the small size of metal nanoparticles conveys a high surface energy thereto, which may result in the metal nanoparticles becoming surface-adhered following deposition upon a base substrate, thereby providing a robust structure that is capable of repeated handling during use. The high surface energy may afford chemical bond formation between the base substrate and the metal nanoparticle agglomerates in some cases. An adhesive may further facilitate adherence of metal nanoparticle agglomerates to the base substrate in some cases, as well as promote controlled release of metal in a more active form (e.g., as smaller agglomerates, individual metal nanoparticles, metal ions, or agglomerates of metal ions), thereby conveying antiseptic activity upon a skin surface over extended periods of time. The high surface energy of metal nanoparticles may also promote biocidal activity when metal nanoparticle agglomerates are distributed within a fluid medium and contacted with a skin surface as well. In spite of their high surface energy, the metal nanoparticles may retain their nanoparticulate structure within metal nanoparticle agglomerates incorporated upon dressings, wipes and similar structures, and in antiseptic fluid media, as discussed in further detail hereinafter.

Application of an adhesive to a base substrate prior to or during deposition of metal nanoparticle agglomerates thereon via spraying or another suitable deposition technique may afford initial sequestration of the metal nanoparticles during deposition, followed by more robust adherence being realized through surface bonding taking place as a result of the high surface energy of the metal nanoparticles. Once metal nanoparticle agglomerates have been introduced to a surface, particularly in the presence of a suitable adhesive, biocidal activity may be maintained over an extended time, such as over a period of days to weeks.

As used herein, the term "metal nanoparticles" refers to metal particles that are about 250 nm or less in size, particularly about 200 nm or less in size or about 150 nm or less in size, without particular reference to the shape of the metal particles. Copper nanoparticles are metal nanoparticles comprising predominantly copper, optionally with an oxide coating wholly or partially covering the surface of the copper nanoparticles. Likewise, silver nanoparticles are metal nanoparticles comprising predominantly silver, optionally with an oxide coating wholly or partially covering the surface of the silver nanoparticles. The term "metal nanoparticle" broadly refers herein to any metallic structure having at least one dimension of about 250 nm or less, particularly about 200 nm or less or about 150 nm or less, and includes other structures that are not substantially spherical in nature, such as metal platelets/disks, metal nanowires, or the like. Other metal nanostructures may be used in addition to or as alternatives to spherical or substantially spherical metal nanoparticles, or agglomerates thereof, in the disclosure herein. The metal nanoparticles or similar nanostructures may include a surfactant coating, which may preclude fusion of the metal nanoparticles from taking place until a desired time under specified conditions and aid in forming metal nanoparticle agglomerates in some instances. The surfactant coating may or may not persist once the metal nanoparticle agglomerates have been adhered to a base substrate or distributed in a suitable fluid medium.

The term "metal nanoparticle agglomerates" and equivalent grammatical forms thereof refers to a grouping of metal nanoparticles having at least one dimension ranging from about 0.1 to about 35 microns in size, particularly about 0.1 microns to about 15 microns in size, and more particularly about 0.1 microns to about 5 microns in size. Individual metal nanoparticles within a metal nanoparticle agglomerate may reside within the size ranges indicated above, and the individual metal nanoparticles may be associated with one another through non-covalent, covalent, or metallic bonding interactions. The term "associated" refers to any type of bonding force that holds a grouping of metal nanoparticles together in a metal nanoparticle agglomerate. The bonding force may be overcome to produce individual metal nanoparticles or smaller metal nanoparticle agglomerates (clusters) in some instances.

The terms "consolidate," "consolidation" and other variants thereof are used interchangeably herein with the terms "fuse," "fusion" and other variants thereof. These terms refer to at least partial coalescence of metal nanoparticles with one another.

Once a surfactant coating has been lost from the surface of metal nanoparticles, as discussed further below, surface oxidation of the metal nanoparticles in a metal nanoparticle agglomerate may occur. Oxidation of metal nanoparticles in proximity to a wound, burn or similar site of potential or active infection may also lead to formation of reactive and potentially mobile salt compounds upon a substrate surface and/or a skin surface. Such salt compounds may include, for example, chlorides, bisulfites, formates, acetates, and bicarbonates. Chlorides, for example, may result from chloride ions in sweat or other bodily fluids. The salt compounds may be present as a surface coating upon at least a portion of the metal nanoparticles. Formation of such salts may be particularly prevalent upon exposure of the metal nanoparticles to a moist environment, including those present when in contact with a skin surface, as specified for a bicarbonate salt in Reaction 1 below. Dry conditions, in contrast, may favor formation of at least a partial oxide coating upon the surface of the metal nanoparticles, as specified in Reaction 2 below.

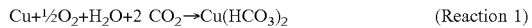

$$Cu + \tfrac{1}{2}O_2 + H_2O + 2\,CO_2 \rightarrow Cu(HCO_3)_2 \quad \text{(Reaction 1)}$$

$$Cu + \tfrac{1}{2}O_2 \rightarrow Cu_2O \quad \text{(Reaction 2)}$$

The salts may be surfactant-stabilized salt complexes comprising one or more surfactants (e.g., one or more amine surfactants in the case of copper nanoparticles) and sufficient salt anions to achieve charge balance. Charge balancing anions may include, for example, halogen, particularly chloride; bisulfite; bicarbonate; lactate; or the like. The charge balancing anions are relatively labile and may be released to generate open coordination sites for binding DNA, proteins, or like biomolecules. The surfactant-stabilized salt complexes may be relatively mobile upon the surface of a base substrate, even when bound within an adhesive, and provide a higher effective coverage of metal nanoparticles thereupon compared to if metal nanoparticles remained fully fixed in place.

In addition to salt compounds or surfactant-stabilized forms thereof generated in situ during use, metal salts or surfactant-stabilized forms thereof may be combined with metal nanoparticle agglomerates prior to deposition of the metal nanoparticle agglomerates upon a fabric, polymer fiber or film, or other base substrate, or when deposited directly upon a surface subject to infection. Any of the preceding counteranion forms of the metal salts may be utilized in the disclosure herein. When combined with metal nanoparticle agglomerates, metal salts or surfactant-stabilized forms thereof may themselves surprisingly aid in killing or inactivating infective agents. When present, the added metal salt compounds may be present at a ratio ranging from about 0.01 to about 0.001 on a weight basis with respect to the metal nanoparticles in the metal nanoparticle agglomerates. The added metal salt compounds may also be deposited upon a fabric, polymer film, or similar base substrate separately from the metal nanoparticle agglomerates, such as by forming a solution of metal salt in a solvent such as an alcohol or acetone, for example, which may be contacted with the fabric, polymer fiber or film, or similar base substrate through spraying or dip coating. The concentration of metal salt in a spray or dip coating formulation may range from about 0.5 ppm to about 50 ppm. The coating density of the added metal salt upon a fabric, polymer fiber or film, or similar base substrate may range from about 0.01 to about 0.5 mg/in$^2$ or about 0.01 mg/in$^2$ to about 0.1 mg/in$^2$.

Before discussing more particular aspects of the present disclosure in further detail, additional brief description of metal nanoparticles and their processing conditions, particularly silver or copper nanoparticles, will first be provided. Metal nanoparticles exhibit a number of properties that can differ significantly from those of the corresponding bulk metal. One property of metal nanoparticles that can be of particular importance for processing is nanoparticle fusion (consolidation) that occurs at the metal nanoparticles' fusion temperature. As used herein, the term "fusion temperature" refers to the temperature at which a metal nanoparticle liquefies, thereby giving the appearance of melting. At or above the fusion temperature, consolidation with other metal nanoparticles may readily take place. Once disposed upon a surface, individual metal nanoparticles or metal nanoparticles within metal nanoparticle agglomerates may undergo fusion with one another as well, thereby forming a network of at least partially fused metal nanoparticles. In other particular examples, metal nanoparticles in the metal nanoparticle agglomerates may remain unfused to one another but become adhered to a base substrate over a period of time of contacting the base substrate. Metal nanoparticle agglomerates result when metal nanoparticles associate together without undergoing fusion prior to deposition upon a surface and individual metal nanoparticles are still identifiable.

Advantageously and surprisingly, metal nanoparticles, such as silver and/or copper nanoparticles or agglomerates thereof, can become adhered to various types of base substrates even well below their fusion temperature, thereby allowing surface bonding to take place, as discussed further herein. Adherence may be promoted by a surfactant coating upon the metal nanoparticles, as well as the high surface area of the metal nanoparticles, which may afford high van der Waals interaction forces with a base substrate. Depending on the density at which metal nanoparticle agglomerates are loaded onto a base substrate and the temperature at which they are processed thereon, individual metal nanoparticles may or may not be further fused together when deposited upon a base substrate. Desirably, the metal nanoparticles may remain at least partially unfused, preferably substantially unfused, to facilitate time-release of individual metal nanoparticles and metal nanoparticle clusters from larger metal nanoparticle agglomerates upon the base substrate. Oxidized metal forms of metal nanoparticles may be released from metal nanoparticle agglomerates upon a surface as well, particularly after a surfactant coating thereon has been removed or lost.

Upon decreasing in size, particularly below about 20 nm in equivalent spherical diameter, the temperature at which metal nanoparticles liquefy drops dramatically from that of the corresponding bulk metal. For example, copper nanoparticles having a size of about 20 nm or less can have fusion temperatures of about 220° C. or below, or about 200° C. or below, or even about 175° C. or below in comparison to bulk copper's melting point of 1083° C. Silver nanoparticles may similarly display a significant deviation from the melting point of bulk silver below a nanoparticle size of about 20 nm. Thus, the consolidation of metal nanoparticles taking place at the fusion temperature as a result of the high surface energy can allow structures containing bulk metal to be fabricated at significantly lower processing temperatures than when working directly with the bulk metal itself as a starting material. More specifically, bulk metal may be dispersed upon various surfaces that would otherwise be thermally incompatible with the processing temperatures required to introduce molten metal thereon. The small particle sizes of the metal nanoparticles, even in agglomerated form, may promote ready dispersion within formulations suitable for application upon a base substrate or within a fluid medium. Once deposited upon a base substrate, metal nanoparticles or agglomerates thereof, may become strongly adhered to the base substrate, optionally in the presence of an adhesive, even without being raised above the fusion temperature and forming bulk metal, as described further hereinbelow.

When seeking to facilitate biocidal activity, metal nanoparticle agglomerates containing larger metal nanoparticles may be advantageous in several respects compared to individual metal nanoparticles of smaller size. Individual metal nanoparticles, particularly metal nanoparticles smaller than about 50 nm or about smaller than about 20 nm, may react and lose their biocidal activity rather quickly, especially if excessive surface oxidation occurs. Metal nanoparticle agglomerates, in contrast, are more stable and may convey a time-release profile of metal in a more active form that is sustained over multiple days, up to about 30 days, for instance. Larger metal nanoparticles over about 50 nm in size may further facilitate time-release of active metal from metal nanoparticle agglomerates and slow the rate of surface oxidation as well. As such, as least a majority of the metal nanoparticles in the metal nanoparticle agglomerates may be larger than about 50 nm in size in the disclosure herein. Metal nanoparticle agglomerates of different sizes may further extend the range of time over which acceptable biocidal activity may be displayed. In addition, metal nanoparticle agglomerates may exhibit a tortuous, complex surface that provides a high surface area for capturing bacteria, viruses, and other infective agents, and promoting inactivation thereof.

A number of scalable processes have been developed for producing bulk quantities of metal nanoparticles in a targeted size range. Most typically, such processes for producing metal nanoparticles take place by reducing a metal precursor in the presence of one or more surfactants. The as-isolated metal nanoparticles may have a surfactant coating thereon and be isolated as a plurality of nanoparticle agglomerates. The agglomerates may be broken apart, while retaining the surfactant coating, or the agglomerates may be used directly without further processing. While present, the surfactant coating may facilitate surface adhesion through van der Waals interactions and limit oxidation of the surface of the metal nanoparticles. The agglomerates may convey a time-release profile of providing metal in an active form upon a base substrate or within a fluid medium for subsequent contact with a wound, burn, or other active or potential site of infection upon a skin surface.

Metal nanoparticle agglomerates suitable for use in the disclosure herein may be of an advantageous size range to facilitate dispensation via spraying or dip coating upon a base substrate or for direct use in a suitable fluid medium prior to contacting a skin surface containing an active or potential site of infection. The metal nanoparticle agglomerates can be isolated and purified from a reaction mixture by common isolation techniques and processed into a suitable spray formulation for surface dispensation or dispersed in another suitable fluid medium. If desired, the surfactant coating of the metal nanoparticles may be removed through gentle heating, gas flow, and/or vacuum once the metal nanoparticles have been deposited upon a base substrate, thereby affording a much higher surface energy and a commensurate increase in reactivity. Alternately, the surfactant coating may be lost upon extended contact with the base substrate without undergoing additional heating or other processing, with adherence to the base substrate occurring following surfactant loss. The surfactant coating may remain for at least some period of time upon the base substrate, such that the metal nanoparticles are retained as individuals within the metal nanoparticle agglomerates. Once the surfactant coating has been removed or lost, the high surface energy of the metal nanoparticles may facilitate adherence of the metal nanoparticles to the base substrate. The metal nanoparticles may or may not become fused together during this process. For more effective infection control, the metal nanoparticles may more desirably remain unfused within the metal nanoparticle agglomerates.

Metal nanoparticle agglomerates having a range of sizes may be used in the disclosure herein, such as those within a range of about 0.1 microns to about 35 microns, or about 0.1 microns to about 15 microns, or about 0.1 microns to about 5 microns, or about 0.5 microns to about 5 microns, or about 3 microns to about 5 microns. Metal nanoparticle agglomerates in these size ranges may be advantageous in terms of their ability to be dispensed through aerosol formation on to a base substrate and/or distributed in a fluid medium. Metal nanoparticle agglomerates within any of these size ranges may be utilized in the disclosure herein. Agglomerates of these sizes, and even larger, may be more effectively retained upon a base substrate than are individual metal nanoparticles or smaller agglomerates. Within the agglomerates, recognizable sub-structures may be present prior to metal nanoparticle fusion such as, but not limited to, 10-50 nm thick platelets, 100-250 nm wide spheres, metal nanowires, the like, or any combination thereof. Copper nanoparticles and/or silver nanoparticles may also be combined with pre-made nanowires (e.g., copper nanowires or silver nanowires) in a suitable spray formulation for deposition upon a surface as well. Moreover, agglomerates of metal nanoparticles having different agglomerate sizes may release metal nanoparticles and even smaller clusters of metal nanoparticles at different rates to the surface of a base substrate but without being substantially released in vivo, thereby affording the ability to tailor the release rate and duration by combining different agglomerate sizes together. As metal nanoparticles are released from the agglomerates at different rates, the metal nanoparticles or small clusters thereof may migrate over a surface to afford biocidal coverage that is more complete than the actual coverage density of the metal nanoparticle agglomerates upon the surface. By differentially releasing metal in an active form from metal nanoparticle agglomerates having a range of sizes upon a substrate surface, a time-release profile of active-form metal may be realized. Thus, activity against various infective agents may be retained over several days, such as at least about 3 days, or at least about 5 days, or at least about 7 days, or at least about 10 days, or at least about 14 days, or at least about 21 days, or at least about 30 days. An adhesive in contact with the metal nanoparticle agglomerates may further facilitate a time-release profile of metal in a more active form as well, while precluding release of free metal nanoparticles from the base substrate. Suitable adhesives are not considered to be particularly limited and are specified in more detail below.

Any suitable technique can be employed for forming the metal nanoparticles used in the disclosure herein. Particularly facile metal nanoparticle fabrication techniques, particularly for copper nanoparticles, are described in U.S. Pat. Nos. 7,736,414, 8,105,414, 8,192,866, 8,486,305, 8,834,747, 9,005,483, 9,095,898, and 9,700,940, each of which is incorporated herein by reference in its entirety. Similar procedures may be used for synthesizing silver nanoparticles. As described therein, metal nanoparticles can be fabricated in a narrow size range by reduction of a metal salt in a solvent in the presence of a suitable surfactant system, which can include one or more different surfactants. Further description of suitable surfactant systems follows below. Tailoring of the surfactant system, the reaction concentration, temperature, and like factors may determine the size range of metal nanoparticles that are obtained from a metal nanoparticle synthesis. Without being bound by any theory or mechanism, it is believed that the surfactant system can mediate the nucleation and growth of the metal nanoparticles, limit surface oxidation of the metal nanoparticles while the surfactant system is adhered thereto, and/or inhibit metal nanoparticles from extensively aggregating with one another prior to being at least partially fused together. As noted above, small agglomerates of metal nanoparticles may be formed in many instances. Suitable organic solvents for solubilizing metal salts and forming metal nanoparticles can include, for example, formamide, N,N-dimethylformamide, dimethyl sulfoxide, dimethyl propylene urea, hexamethylphosphoramide, tetrahydrofuran, glyme, diglyme, triglyme, tetraglyme, proglyme, or polyglyme. Reducing agents suitable for reducing metal salts and promoting the formation of metal nanoparticles can include, for example, an alkali metal in the presence of a suitable catalyst (e.g., lithium naphthalide, sodium naphthalide, or potassium naphthalide) or borohydride reducing agents (e.g., sodium borohydride, lithium borohydride, potassium borohydride, or tetraalkylammonium borohydrides).

Figure 2:
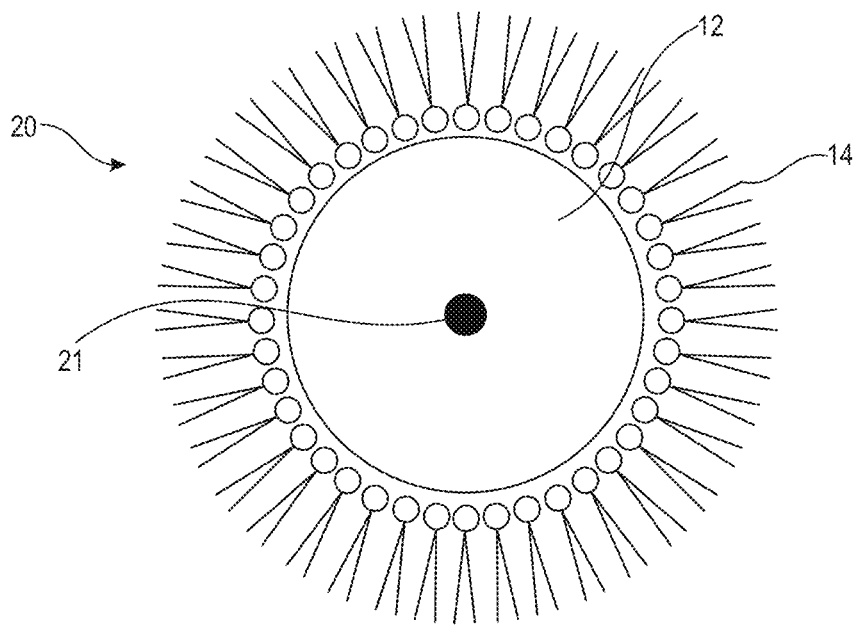
Figure 3:
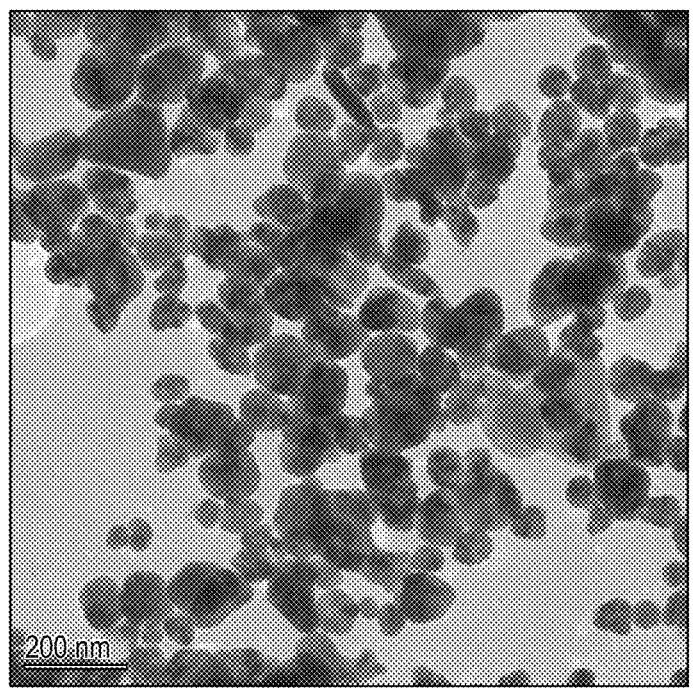
FIG. 3 shows an illustrative SEM image of substantially individual copper nanoparticles.
Figure 4:
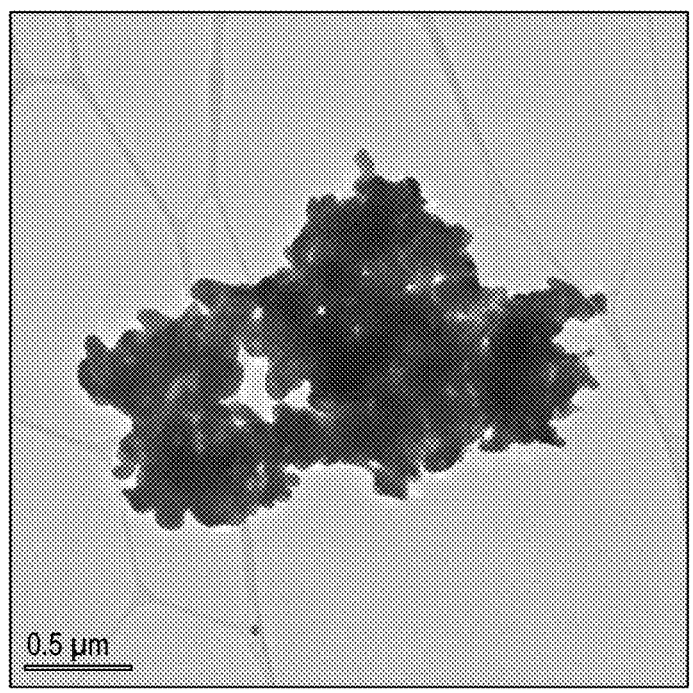
FIG. 4 shows an illustrative SEM image of an agglomerate of copper nanoparticles.
Figure 5:
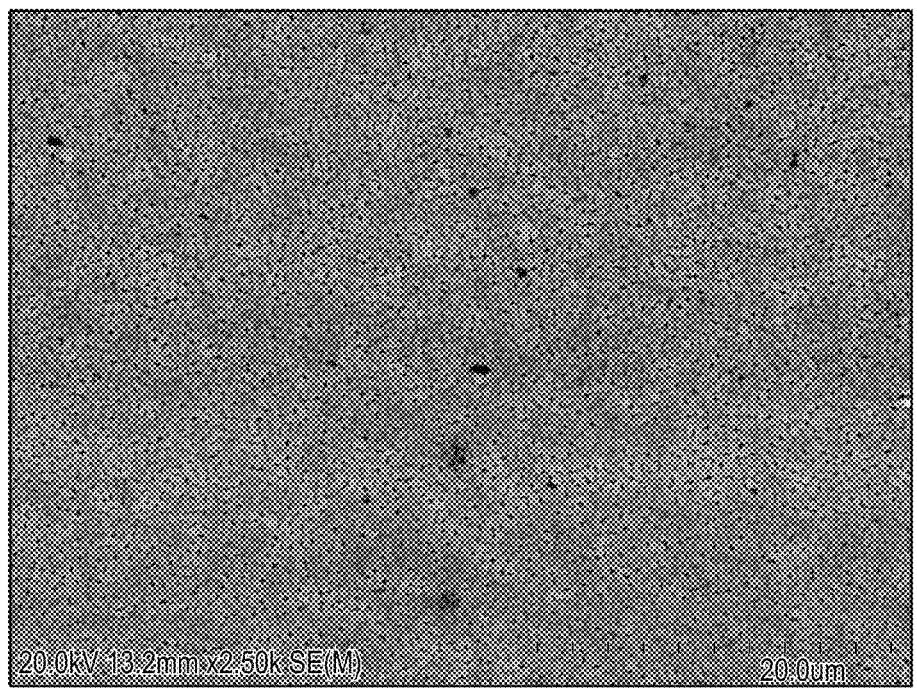
FIG. 5 shows an illustrative SEM image of a copper nanoparticle network obtained after fusion of a plurality of copper nanoparticles to each other.
Figure 6A:
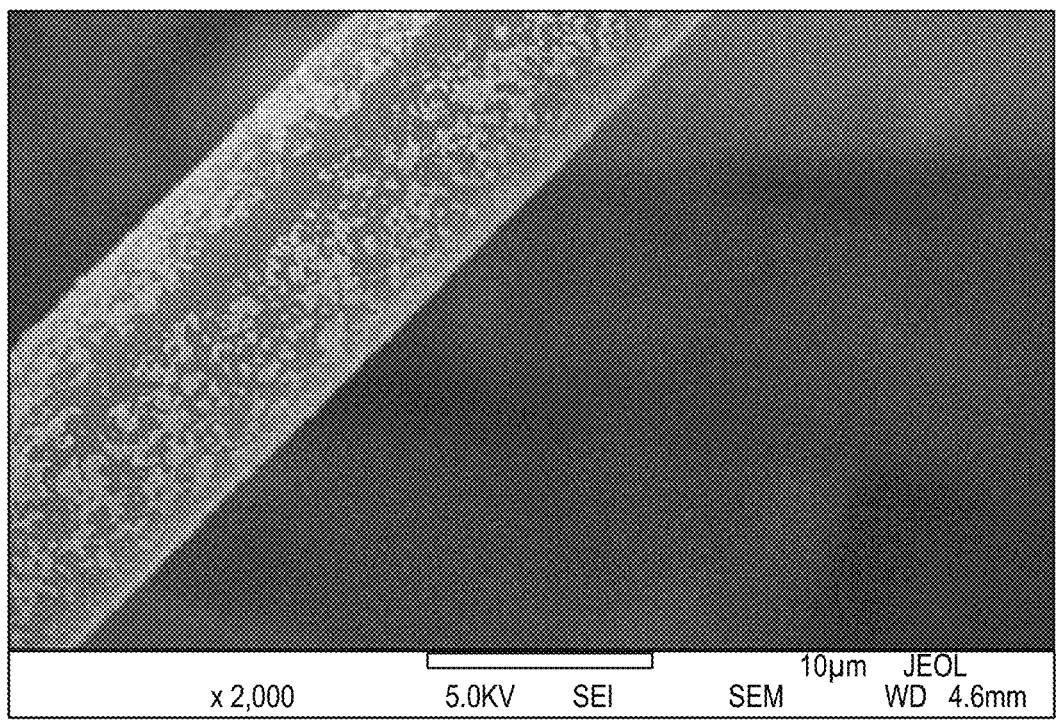
FIGS. 6A and 6B show illustrative SEM images of agglomerates of copper nanoparticles disposed upon fibers.
Figure 6B:
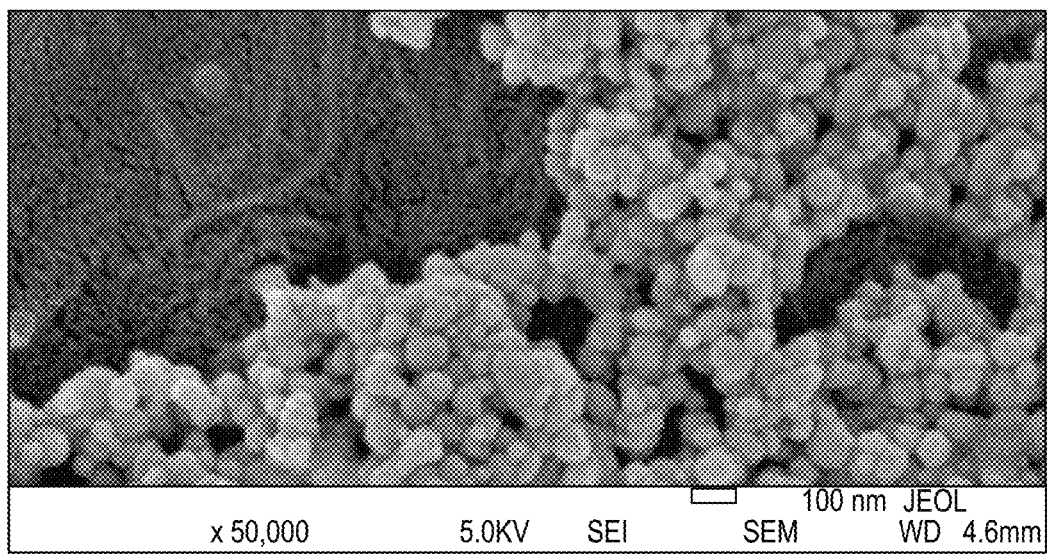

FIGS. 1 and 2 show diagrams of presumed structures of metal nanoparticles having a surfactant coating thereon. As shown in FIG. 1, metal nanoparticle 10 includes metallic core 12 and surfactant layer 14 overcoating metallic core 12. Surfactant layer 14 can contain any combination of surfactants, as described in more detail below. Metal nanoparticle 20, shown in FIG. 2, is similar to that depicted in FIG. 1, except metallic core 12 is grown about nucleus 21. Because nucleus 21 is buried deep within metallic core 12 in metal nanoparticle 20 and is very small in size, it is not believed to significantly affect the overall nanoparticle properties. Nucleus 21 may comprise a salt or a metal, wherein the metal may be the same as or different than that of metallic core 12. In some embodiments, the nanoparticles can have an amorphous morphology. FIGS. 1 and 2 may be representative of the microscopic structure of copper or silver nanoparticles suitable for use in the disclosure herein. FIG. 3 shows an illustrative SEM image of substantially individual copper nanoparticles. FIG. 4 shows an illustrative SEM image of an agglomerate of copper nanoparticles, which may be used in the disclosure herein. FIG. 5 shows an illustrative SEM image of a copper nanoparticle network obtained after fusion of a plurality of copper nanoparticles to each other. FIGS. 6A and 6B show illustrative SEM images of agglomerates of copper nanoparticles adhered to textile fibers. The agglomerates of copper nanoparticles are robustly adhered to the textile fibers but do not undergo fusion with one another.

As discussed above, the metal nanoparticles have a surfactant coating containing one or more surfactants upon their surface. The surfactant coating can be formed on the metal nanoparticles during their synthesis. Formation of a surfactant coating upon metal nanoparticles during their syntheses can desirably limit the ability of the metal nanoparticles to fuse to one another prematurely, limit agglomeration of the metal nanoparticles to a desired extent or agglomerate size, and promote the formation of a population of metal nanoparticles having a narrow size distribution. At least partial loss of the surfactant coating may occur upon heating the metal nanoparticles up to the fusion temperature, including at least some surfactant loss well below the fusion temperature for low-boiling surfactants. Surfactant loss may be further promoted by flowing gas and/or application of vacuum (reduced pressure), as desired, even below the fusion temperature. At least some surfactant loss may occur at room temperature and ambient pressure conditions in some instances when the metal nanoparticles are deposited upon a base substrate. Sealing the metal nanoparticles upon the base substrate in an inert atmosphere may slow the rate of surfactant loss. Following surfactant loss, fusion of the metal nanoparticles may take place above the fusion temperature. If the metal nanoparticles are not heated above the fusion temperature, an uncoated metal nanoparticle having a high surface energy may be obtained. The high surface energy may promote adherence of the metal nanoparticles to the base substrate and provide a highly reactive metal form for promoting infection control, both when adhered to a base substrate or dispersed in a fluid medium. The metal nanoparticles may become adhered to a base substrate even below the fusion temperature once the surfactant coating has been removed. When heated above the fusion temperature, nanoparticle fusion may take place in combination with the metal nanoparticles becoming adhered to the base substrate.

Various types of metal nanoparticles may be synthesized by metal reduction in the presence of one or more suitable surfactants, such as copper nanoparticles or silver nanoparticles. Copper and/or silver can be particularly desirable metals for use in the embodiments of the present disclosure due to their ability to promote killing or inactivation of infective agents when deposited upon a skin surface, such as upon a skin penetration or similar type of skin injury. Copper may also be advantageous due to its low cost. Zinc can similarly display biocidal activity against bacteria, viruses and similar microorganisms and may be substituted for copper or silver in any of the embodiments disclosed herein. Zinc may also be used in combination with copper and/or silver as well. NiO and $TiO_2$ may be used similarly in this respect. Nanoparticle forms of Zn, Ni and Ti may be used.

When copper nanoparticles and silver nanoparticles are present upon a surface together, fusion between the copper nanoparticles and the silver nanoparticles may occur as well. Combinations of copper nanoparticles and silver nanoparticles may afford particular synergy against infective agents not remediated adequately with a single metal alone, including conveying biocidal activity against different infective agents and/or enhancing activity against a particular infective agent.

In various embodiments, the surfactant system present within the metal nanoparticles can include one or more surfactants. The differing properties of various surfactants can be used to tailor the properties of the metal nanoparticles. Factors that can be taken into account when selecting a surfactant or combination of surfactants for inclusion upon the metal nanoparticles can include, for example, ease of surfactant dissipation from the metal nanoparticles during or prior to nanoparticle fusion, nucleation and growth rates of the metal nanoparticles to impact the nanoparticle size, the metal component of the metal nanoparticles, the extent of agglomeration needed, and the like. Main group metals, for example, may require different surfactants than do transition metals.

In some embodiments, an amine surfactant or combination of amine surfactants, particularly aliphatic amines, can be present upon the metal nanoparticles. Amine surfactants can be particularly desirable for use in conjunction with copper nanoparticles or silver nanoparticles due to their good affinity for these transition metals. In some embodiments, two amine surfactants can be used in combination with one another. In other embodiments, three amine surfactants can be used in combination with one another. In more specific embodiments, a primary amine, a secondary amine, and a diamine chelating agent can be used in combination with one another. In still more specific embodiments, the three amine surfactants can include a long chain primary amine, a secondary amine, and a diamine having at least one tertiary alkyl group nitrogen substituent. Further disclosure regarding suitable amine surfactants follows hereinafter.

In some embodiments, the surfactant system can include a primary alkylamine. In some embodiments, the primary alkylamine can be a $C_2$-$C_{18}$ alkylamine. In some embodiments, the primary alkylamine can be a $C_7$-$C_{10}$ alkylamine. In other embodiments, a $C_5$-$C_6$ primary alkylamine can also be used. Without being bound by any theory or mechanism, the exact size of the primary alkylamine can be balanced between being long enough to provide an effective inverse micelle structure during synthesis versus having ready volatility and/or ease of handling during nanoparticle consolidation. For example, primary alkylamines with more than 18 carbons can also be suitable for use in the present embodiments, but they can be more difficult to handle because of their waxy character. $C_7$-$C_{10}$ primary alkylamines, in particular, can represent a good balance of desired properties for ease of use.

In some embodiments, the $C_2$-$C_{18}$ primary alkylamine can be n-hexylamine, n-heptylamine, n-octylamine, n-nonylamine, or n-decylamine, for example. While these are all straight chain primary alkylamines, branched chain primary alkylamines can also be used in other embodiments. For example, branched chain primary alkylamines such as, for example, 7-methyloctylamine, 2-methyloctylamine, or 7-methylnonylamine can be used. In some embodiments, such branched chain primary alkylamines can be sterically hindered where they are attached to the amine nitrogen atom. Non-limiting examples of such sterically hindered primary alkylamines can include, for example, t-octylamine, 2-methylpentan-2-amine, 2-methylhexan-2-amine, 2-methylheptan-2-amine, 3-ethyloctan-3-amine, 3-ethylheptan-3-amine, 3-ethylhexan-3-amine, and the like. Additional branching can also be present. Without being bound by any theory or mechanism, it is believed that primary alkylamines can serve as ligands in the metal coordination sphere but be readily dissociable therefrom during metal nanoparticle consolidation.

In some embodiments, the surfactant system can include a secondary amine. Secondary amines suitable for forming metal nanoparticles can include normal, branched, or cyclic $C_4$-$C_{12}$ alkyl groups bound to the amine nitrogen atom. In some embodiments, the branching can occur on a carbon atom bound to the amine nitrogen atom, thereby producing significant steric encumbrance at the nitrogen atom. Suitable secondary amines can include, without limitation, dihexylamine, diisobutylamine, di-t-butylamine, dineopentylamine, di-t-pentylamine, dicyclopentylamine, dicyclohexylamine, and the like. Secondary amines outside the $C_4$-$C_{12}$ range can also be used, but such secondary amines can have undesirable physical properties such as low boiling points or waxy consistencies that can complicate their handling.

In some embodiments, the surfactant system can include a chelating agent, particularly a diamine chelating agent. In some embodiments, one or both of the nitrogen atoms of the diamine chelating agent can be substituted with one or two alkyl groups. When two alkyl groups are present on the same nitrogen atom, they can be the same or different. Further, when both nitrogen atoms are substituted, the same or different alkyl groups can be present. In some embodiments, the alkyl groups can be $C_1$-$C_6$ alkyl groups. In other embodiments, the alkyl groups can be $C_1$-$C_4$ alkyl groups or $C_3$-$C_6$ alkyl groups. In some embodiments, $C_3$ or higher alkyl groups can be straight or have branched chains. In some embodiments, $C_3$ or higher alkyl groups can be cyclic. Without being bound by any theory or mechanism, it is believed that diamine chelating agents can facilitate metal nanoparticle formation by promoting nanoparticle nucleation.

In some embodiments, suitable diamine chelating agents can include N,N'-dialkylethylenediamines, particularly $C_1$-$C_4$ N,N'-dialkylethylenediamines. The corresponding methylenediamine, propylenediamine, butylenediamine, pentylenediamine or hexylenediamine derivatives can also be used. The alkyl groups can be the same or different. $C_1$-$C_4$ alkyl groups that can be present include, for example, methyl, ethyl, propyl, and butyl groups, or branched alkyl groups such as isopropyl, isobutyl, s-butyl, and t-butyl groups. Illustrative N,N'-dialkylethylenediamines that can be suitable for inclusion upon metal nanoparticles include, for example, N,N'-di-t-butylethylenediamine, N,N'-diisopropylethylenediamine, and the like.

In some embodiments, suitable diamine chelating agents can include N,N,N',N'-tetraalkylethylenediamines, particularly $C_1$-$C_4$ N,N,N',N'-tetraalkylethylenediamines. The corresponding methylenediamine, propylenediamine, butylenediamine, pentylenediamine or hexylenediamine derivatives can also be used. The alkyl groups can again be the same or different and include those mentioned above. Illustrative N,N,N',N'-tetraalkylethylenediamines that can be suitable for use in forming metal nanoparticles include, for example, N,N,N',N'-tetramethylethylenediamine, N,N,N',N'-tetraethylethylenediamine, and the like.

Surfactants other than aliphatic amines can also be present in the surfactant system. In this regard, suitable surfactants can include, for example, pyridines, aromatic amines, phosphines, thiols, or any combination thereof. These surfactants can be used in combination with an aliphatic amine, including those described above, or they can be used in a surfactant system in which an aliphatic amine is not present. Further disclosure regarding suitable pyridines, aromatic amines, phosphines, and thiols follows below.

Suitable aromatic amines can have a formula of $ArNR^1R^2$, where Ar is a substituted or unsubstituted aryl group and $R^1$ and $R^2$ are the same or different. $R^1$ and $R^2$ can be independently selected from H or an alkyl or aryl group containing from 1 to about 16 carbon atoms. Illustrative aromatic amines that can be suitable for use in forming metal nanoparticles include, for example, aniline, toluidine, anisidine, N,N-dimethylaniline, N,N-diethylaniline, and the like. Other aromatic amines that can be used in conjunction with metal nanoparticles can be envisioned by one having ordinary skill in the art.

Suitable pyridines can include both pyridine and its derivatives. Illustrative pyridines that can be suitable for inclusion upon metal nanoparticles include, for example, pyridine, 2-methylpyridine, 2,6-dimethylpyridine, collidine, pyridazine, and the like. Chelating pyridines such as bipyridyl chelating agents may also be used. Other pyridines that can be used in conjunction with metal nanoparticles can be envisioned by one having ordinary skill in the art.

Suitable phosphines can have a formula of $PR_3$, where R is an alkyl or aryl group containing from 1 to about 16 carbon atoms. The alkyl or aryl groups attached to the phosphorus center can be the same or different. Illustrative phosphines that can be present upon metal nanoparticles include, for example, trimethylphosphine, triethylphosphine, tributylphosphine, tri-t-butylphosphine, trioctylphosphine, triphenylphosphine, and the like. Phosphine oxides can also be used in a like manner. In some embodiments, surfactants that contain two or more phosphine groups configured for forming a chelate ring can also be used. Illustrative chelating phosphines can include 1,2-bisphosphines, 1,3-bisphosphines, and bis-phosphines such as BINAP, for example. Other phosphines that can be used in conjunction with metal nanoparticles can be envisioned by one having ordinary skill in the art.

Suitable thiols can have a formula of RSH, where R is an alkyl or aryl group having from about 4 to about 16 carbon atoms. Illustrative thiols that can be present upon metal nanoparticles include, for example, butanethiol, 2-methyl-2-propanethiol, hexanethiol, octanethiol, benzenethiol, and the like. In some embodiments, surfactants that contain two or more thiol groups configured for forming a chelate ring can also be used. Illustrative chelating thiols can include, for example, 1,2-dithiols (e.g., 1,2-ethanethiol) and 1,3-dithiols (e.g., 1,3-propanethiol). Other thiols that can be used in conjunction with metal nanoparticles can be envisioned by one having ordinary skill in the art.

As mentioned above, a distinguishing feature of metal nanoparticles is their high surface energy, which may promote adherence to base substrates in a form suitable for providing a highly active metal form retained upon the base substrate for placement in contact with a wound, burn, or a similar skin injury, or an infection site in need of treatment upon a skin surface. A surfactant coating and/or an adhesive may further facilitate metal nanoparticle agglomerate adhesion to a base substrate to promote extended release of active metal from the metal nanoparticle agglomerates.

When deposited upon a base substrate comprising textile fibers, particularly by spraying, the metal nanoparticle agglomerates may be located predominantly upon the surface of the textile fibers or extend to a depth of about 3-4 fiber layers. Roll-to-roll dip coating and gravure coating may also afford predominantly a surface coating of metal nanoparticles or metal nanoparticle agglomerates. The predominant surface coating ensures efficient use of the metal nanoparticles compared to other types of dip coating processes, wherein metal nanoparticles may be deposited more deeply throughout predominantly all of the fiber layers. Metal nanoparticles buried within deeper fiber layers may be ineffective or less effective for conveying antiseptic activity since more of the metal nanoparticles or metal nanoparticle agglomerates are buried within the base substrate and are more remote from a wound or similar site of potential or active infection upon a skin surface.

The loading of metal nanoparticles upon the base substrate may include a coverage density ranging from about 0.1 mg/in$^2$ to about 10 mg/in$^2$, or about 0.5 mg/in$^2$ to about 5 mg/in$^2$, or about 1 mg/in$^2$ to about 2 mg/in$^2$ or about 0.5 mg/in$^2$ to about 3 mg/in$^2$. The coverage of metal nanoparticles upon the base substrate may range from about 5% to about 95% by area, or about 50% to about 99% by area, or about 60% to 95% by area. Even coverage densities as low as 3-5% by area may be effective for promoting biocidal activity in the disclosure herein. Coverage densities of added metal salt compounds, when present, may range from about 10-fold to about 1000-fold less than metal nanoparticle agglomerates upon a surface where they are deposited.

When present at the foregoing coverages and coverage densities upon a base substrate to be contacted with an infective agent upon a skin surface or a skin surface subject to infection, the metal nanoparticles may effectively inactivate various infective agents, including certain bacteria and viruses, oftentimes more effectively than does a bulk metal surface comprising the same metal(s). For example, copper nanoparticle agglomerates adhered to a fabric surface and retaining their nanoparticulate form may inactivate/kill viruses in as little as 10 seconds, or 20 seconds, or 30 seconds, or 40 seconds, or 50 seconds, or 1 minute, or 2 minutes, or 3 minutes, or 4 minutes, or 5 minutes, or 6 minutes, or 7 minutes, or 8 minutes, or 9 minutes, or 10 minutes. Up to 100% kill rates or inactivation rates may be realized. Bulk copper surfaces, in contrast, may take several hours to reach the same level of inactivation. Bacteria may be similarly treated in various instances.

Accordingly, antiseptic substrates of the present disclosure may comprise a base substrate, and metal nanoparticle agglomerates adhered thereto, wherein the metal nanoparticle agglomerates are present in an amount or form suitable for providing infection control when placed in proximity to a skin penetration, a skin injury, a burn, a site to be subjected to a skin penetration (e.g., an incision or injection site), or the like, or an active topical infection upon a skin surface. Base substrates, such as gauze or other fabrics, may have metal nanoparticle agglomerates disposed thereon in a form suitable for providing infection control. After the base substrate has been placed in proximity to a skin site in need of infection control, the metal nanoparticle agglomerates may be transferred to the skin site, or infection control may be realized with the metal nanoparticle agglomerates remaining adhered to the base substrate. Wipes having metal nanoparticle agglomerates adhered thereto may similarly be utilized to promote disinfection at a site of skin penetration or a site at which a skin penetration may be introduced (e.g., prior to surgery generating an incision at the skin site).

The base substrate may comprise a material selected from a polymer, a textile, paper, cardboard, or any combination thereof. The base substrate may be in a form of a fabric, tape, sheet, film, VELCRO, or any combination thereof. Polymer substrates may have the metal nanoparticles or agglomerates thereof at least partially embedded the polymer substrate, such as within polymer fibers comprising the polymer substrate.

The metal nanoparticle agglomerates may comprise copper nanoparticles, silver nanoparticles, or any combination thereof. Copper nanoparticles in an amount effective to control infection (e.g., coverage of about 60% to about 95% of the base substrate by area and a coverage density of about 1 mg/in$^2$ to about 2 mg/in$^2$) may be especially efficacious for mitigating infection spread from bacteria and viruses. Without being bound by any theory or mechanism, it is believed that Cu(0) may be oxidized to Cu(I) on the base substrate in a slow process, with further oxidation to Cu(II) taking place rapidly thereafter. When contacting an infective agent, such as bacteria or viruses, hydroxyl radicals and lipid radicals may form, which may disrupt the outer lipid bilayer or protein shell of a virus or bacterium. In addition, copper may bind to heteroatoms (e.g., S, N or P) within amino acids, proteins, DNA and/or RNA of viruses, bacteria and other pathogens to result in inactivation. Metal penetration within a cell membrane or protein coat may also occur, wherein the metal may inhibit DNA/RNA replication and/or inhibit protein transport.

Combinations of copper nanoparticles and silver nanoparticles may afford particular synergy against infective agents not remediated adequately with a single metal alone. That is, copper nanoparticles and silver nanoparticles may convey biocidal activity against different infective agents. In addition, enhanced activity against a particular infective agent may be realized when both copper nanoparticles and silver nanoparticles are present, as compared to copper nanoparticles or silver nanoparticles alone.

Antiseptic fluid formulations comprising metal nanoparticle agglomerates, discussed further below, may similarly comprise copper nanoparticles, silver nanoparticles, or any combination thereof.

Antiseptic fluid formulations comprising metal nanoparticle agglomerates are also contemplated in the disclosure herein. The antiseptic fluid formulations may similarly be contacted with a skin penetration, skin injury, a burn, a site to be subjected to a skin penetration, or an active skin infection to provide infection control against at least one infective agent. Therapeutic fluid formulations may be applied directly to a skin surface having an active infection. Preventative fluid formulations may be applied to a site subject to a potential infection or to provide disinfection prior to experiencing an infection-causing event.

Suitable forms for the antiseptic fluid formulations are not considered to be particularly limited. Liquid forms may include solutions or suspensions of metal nanoparticle agglomerates, which may be formulated with further additives to make the liquid form suitable for dispensation by spraying onto a site in need of infection control, or by pouring, wiping, rubbing, or the like onto a site in need of infection control, such as upon a skin surface at a site of skin penetration or skin injury. Liquid forms suitable for spraying may also be suitable for application by pouring, wiping, or the like in various instances. Preventative and therapeutic fluid formulations comprising metal nanoparticle agglomerates may also be formulated as a cream, salve, ointment, balm, gel or the like for application to a skin surface in need of infection control. Such fluid formulations may include ingredients compatible with contacting a skin surface and further that are compatible with metal nanoparticle agglomerates. When applied directly to an infection site, preventative or therapeutic fluid formulations may be removed soon after being present for a sufficient time to inactivate one or more infective agents, or they may be left in place to undergo slow removal in the course of daily activities.

In some cases, therapeutic fluid formulations comprising metal nanoparticle agglomerates may be used in combination with preventative fluid formulations or in combination with an antiseptic substrate comprising metal nanoparticle agglomerates bound thereto. For example, a therapeutic cream comprising metal nanoparticle agglomerates may be applied to an active site of infection, and a wound dressing containing metal nanoparticle agglomerates may overlay the wound to provide additional infection control on an ongoing basis. In some instances, a dry patch containing metal nanoparticle agglomerates may be applied to a skin penetration for just a few minutes and then removed to provide effective infection control.

Alternately, a fluid formulation comprising metal nanoparticle agglomerates in a therapeutically effective form or amount may be used to treat a base substrate not otherwise having metal nanoparticle agglomerates or other type of antiseptic agent thereon. For example, untreated gauze may be sprayed with a fluid formulation comprising metal nanoparticle agglomerates before being applied to a skin surface in need of infection control.

Antiseptic substrates of the present disclosure may be formed by spraying metal nanoparticle agglomerates upon a base substrate using a suitable spray formulation. Such methods may comprise providing a base substrate, and depositing metal nanoparticle agglomerates upon the base substrate in an effective amount to provide antiseptic activity, wherein the metal nanoparticle agglomerates are deposited with a spray formulation comprising an aerosolizable fluid medium and metal nanoparticle agglomerates dispersed in the aerosolizable fluid medium. The metal nanoparticle agglomerates may be adhered to the base substrate after being deposited thereon or become adhered at a later time. The metal nanoparticles within the metal nanoparticle agglomerates may remain as individual metal nanoparticles after being adhered to the base substrate or become at least partially fused to one another. More desirably, the metal nanoparticles within the metal nanoparticle agglomerates may remain unfused when providing infection control according to the disclosure herein. Adhesion of the metal nanoparticle agglomerates to the base substrate may be promoted by an adhesive or adhesion may occur directly to the base substrate upon at least partial loss of one or more surfactants from the metal nanoparticles. Even when the metal nanoparticles remain unfused, a surfactant coating may be removed therefrom to facilitate release of active metal from the metal nanoparticle agglomerates.

Alternately, antiseptic substrates of the present disclosure may be formed by dip coating or applying a cream, salve, ointment, or similar metal nanoparticle formulation directly to a base substrate.

Spray formulations suitable for applying metal nanoparticle agglomerates to a base substrate may comprise an aerosolizable fluid medium and a plurality of metal nanoparticle agglomerates dispersed in the aerosolizable fluid medium. The aerosolizable fluid medium may be an aerosol propellant or a volatile organic solvent, depending on whether the spray formulations will be sprayed via pumping or from an aerosol spray vessel, such as an aerosol spray can. Aerosol spray cans may be particularly desirable, since they are in wide use and are easily manufactured and shipped. Aerosol propellants may afford sprayed droplet sizes ranging from about 10-150 microns, whereas mechanically pumped sprays may have a larger droplet size in a range of about 150-400 microns. The aerosolized droplets are easily directed to a specified location and do not linger overly long in air before settling on a surface. The spray formulation may be utilized to deposit metal nanoparticles or agglomerates thereof upon a base substrate or directly upon a skin surface.

Spray formulations comprising metal nanoparticle agglomerates, such as silver nanoparticles and/or copper nanoparticles and their agglomerates, may be prepared by dispersing as-produced or as-isolated metal nanoparticles in an organic matrix containing one or more organic solvents or other liquid medium in which the metal nanoparticle agglomerates may be admixed as a well-dispersed solid. Optionally, the aerosolizable fluid medium of a spray formulation may comprise one or more inorganic components as well, particularly water. Spray formulations refer to both mechanically pumped and forced sprays and sprays dispensed through use of an aerosol propellant. Pumped and forced sprays may be dispensed through gas pressurization, and/or through pressurization with a mechanical or pneumatic pump. An aerosol propellant may be present in a vessel housing an organic matrix containing dispersed metal nanoparticle agglomerates for spray formulations not intended for dispensation via pumping or gas pressurization. Spray formulations containing an aerosol propellant may be stored in a pressurized state, such that the spray formulation may dispensed simply by activating a release or actuator upon a vessel housing the spray formulation.

Aerosol propellants may be utilized when dispensing the metal nanoparticles from a spray can. Any conventional aerosol propellant may be utilized, provided that the metal nanoparticles can be effectively dispersed therein and ejected from the spray can. Organic and/or inorganic aerosol propellants may be used. Suitable inorganic aerosol propellants may include, for example, nitrous oxide or carbon dioxide. Suitable organic aerosol propellants may include, for example, volatile hydrocarbons (e.g., ethane, propane, butane, or isobutane), dimethyl ether, ethyl methyl ether, hydrofluorocarbons, hydrofluoroolefins, or any combination thereof. Chlorofluorocarbons and similar compounds may also be used as an aerosol propellant, but their use is not preferred due to their ozone-depleting properties. Nevertheless, chlorofluorocarbons may be satisfactory when other organic aerosolizable fluid media may not be effectively used.

Particularly suitable organic solvents that may be present in spray formulations suitable for dispensation by pumping or gas-pressurization, or in combination with an aerosol propellant, include one or more alcohols and optionally water. Suitable alcohols include a $C_1$-$C_{11}$ alcohol, or multiple $C_1$-$C_{11}$ alcohols in any combination. Additional alcohol-miscible organic solvents may also be present. Ketone and aldehyde organic solvents, also in the $C_1$-$C_{11}$ size range, may also be used, either alone or in combination with one or more alcohols. Ketone and aldehyde solvents are less polar than are alcohols and may aid in promoting dispersion of metal nanoparticle agglomerates. Low boiling ethers such as diethyl ether, dipropyl ether, and diisopropyl ether, for example, may also be suitably used to promote metal nanoparticle dispersion. One or more glycol ethers (e.g., diethylene glycol, triethylene glycol, or the like), alkanolamines (e.g., ethanolamine, triethanolamine, or the like), or any combination thereof may also be used alone or in combination with one or more alcohols or any of the other foregoing organic solvents. Various glymes may also be used similarly. Water-miscible organic solvents and mixtures of water and water-miscible organic solvents may be used as well, such as water-organic solvent mixtures comprising up to about 50% water by volume, or up to about 75% water by volume, or up to about 90% water by volume.

The organic solvent(s) may be removed either before or after the surfactant coating is lost in the course of promoting adherence of metal nanoparticle agglomerates to a base substrate.

In particular examples, the spray formulations can contain one or more alcohols, which may be $C_1$-$C_{11}$, $C_1$-$C_4$, $C_4$-$C_{11}$ or $C_7$-$C_{11}$ in more particular embodiments. $C_1$-$C_4$ alcohols may be particularly desirable due to their lower boiling points, which may facilitate solvent removal following dispensation. In various embodiments, the alcohols can include any of monohydric alcohols, diols, or triols. One or more glycol ethers (e.g., diethylene glycol and triethylene glycol), alkanolamines (e.g., ethanolamine, triethanolamine, and the like), or any combination thereof may be present in certain embodiments, which may be present alone or in combination with other alcohols. Various glymes may be present with the one or more alcohols in some embodiments.

When using an aerosolizable fluid medium to promote dispensation of the metal nanoparticles, the metal nanoparticles may be directly combined therewith, or the metal nanoparticles may be dissolved in a secondary fluid medium that is subsequently combined with the aerosolizable fluid medium (e.g., as a concentrate). Suitable secondary fluid media may comprise organic solvents such as alcohols, glycols, ethers, or the like. A fluid dispersion of metal nanoparticles within the secondary fluid medium may be combined with an aerosol propellant in a suitable container, such as a spray can. Spray formulations suitable for mechanical dispensation (e.g., using a pump sprayer), described hereinafter, may also utilize one or more organic solvents for dispersing the metal nanoparticles into a form suitable for spraying. Any of the organic solvents or combinations thereof described below may also be suitably combined with an aerosol propellant for dispensation according to the disclosure herein.

Spray formulations comprising an organic solvent may comprise a mixture of organic solvents that evaporates in a specified period of time, typically under ambient conditions. In non-limiting examples, evaporation may take place in about 1 minute or less, or about 2 minutes or less, or about 5 minutes or less, or about 10 minutes or less, or about 15 minutes or less, or about 30 minutes or less. To facilitate evaporation, the metal nanoparticle agglomerates may be dispersed as a concentrate in a higher boiling organic solvent, such as a $C_{10}$ alcohol, which is then combined with a much larger quantity of low boiling organic solvent, such as ethanol or diethyl ether, optionally in further combination with additional organic solvents. The high boiling organic solvent may be sufficiently hydrophobic to facilitate dispersion of the metal nanoparticles in the less hydrophobic organic solvent comprising the majority of the organic phase.

Any of the foregoing organic solvents or mixtures thereof, including water-organic solvent mixtures, may also be utilized to disperse metal nanoparticle agglomerates as a concentrate for combination with an aerosol propellant or other suitable aerosolizable fluid medium.

The spray formulations may exhibit a viscosity value of about 1 cP to about 500 cP, including about 1 cP to about 100 cP. Low viscosity values such as these may facilitate dispensation through spraying. Metal nanoparticle loadings (as metal nanoparticle agglomerates) within the spray formulations to produce the foregoing viscosity values may range from about 1 wt. % to about 35 wt. %, or about 10 wt. % to about 25 wt. %, or about 1 wt. % to about 10 wt. %, or about 10 wt. % to about 15 wt. %.

The metal nanoparticles used in the spray formulations disclosed herein can be about 20 nm or more in size, particularly about 30 nm or more in size, and more particularly about 50 nm or more in size. In particular examples, the metal nanoparticles in the metal nanoparticle agglomerates used herein may feature a majority (≥50%, or ≥60% or ≥70%, or ≥80%, or ≥90%) metal nanoparticles that are about 50 nm or more in size. Metal nanoparticle agglomerates containing such sized metal nanoparticles may be about 0.1 to about 35 microns in size, or about 0.1 to about 15 microns in size, or about 1 micron to about 15 microns in size, or about 1 to about 5 microns in size. Copper nanoparticles in the foregoing size range (particularly 30 nm or above or about 50 nm or above) may afford a mixture of CuO or $Cu_2O$, or a copper salt depending on use conditions, upon a copper metal core, the combination of which may be advantageous for inactivating infective agents upon a surface once applied thereto. Silver nanoparticles in a similar size range may form an advantageous silver oxide coating when processed according to the disclosure herein to promote adherence to a surface. When the copper nanoparticles and/or silver nanoparticles are agglomerated together upon a surface, the oxide coating may extend over at least a portion of the surface of the agglomerate, leaving an exposed copper or silver metal surface below within the porosity of the agglomerate. Metal nanoparticle loadings upon a base substrate may range from about 0.5 wt. % to about 5 wt. % based on total weight.

Copper nanoparticles that are about 20 nm or less in size can and agglomerates thereof may also be used in the disclosure herein, optionally in combination with copper nanoparticles or other metal nanoparticles larger than about 50 nm in size. Copper nanoparticles in this size range may have a fusion temperature of about 220° C. or below (e.g., a fusion temperature in the range of about 140° C. to about 220° C.) or about 200° C. or below, or even about 175° C. or below, which can provide advantages noted above. Silver nanoparticles about 20 nm or less in size may also be used in the present disclosure and similarly exhibit a fusion temperature differing significantly from that of the corresponding bulk metal. Larger metal nanoparticles (either copper or silver nanoparticles), in turn, have a higher fusion temperature, which may rapidly increase and approach that of bulk metal as the nanoparticle size continues to increase. Depending on the processing temperature and the fusion temperature of the copper nanoparticles and/or silver nanoparticles based upon their size, the metal nanoparticles may or may not be fused together upon a base substrate. Regardless of whether the metal nanoparticles become fused or not once deposited upon a base substrate, after the surfactant coating is removed, the copper nanoparticles and/or silver nanoparticles may experience robust adherence to the base substrate and become effective for inactivating various pathogens.

In addition to copper nanoparticles, silver nanoparticles, or alternative nanostructures, other additives may be utilized in combination with metal nanoparticle agglomerates in the disclosure herein. Suitable additives may include, but are not limited to, those capable of producing reactive oxygen species (ROS), which may cause lipid, protein, or DNA damage in microorganisms, eventually leading to cell membrane damage and cell death. These additives may complement or enhance the biocidal activity conveyed by copper nanoparticles, silver nanoparticles, or alternative metal nanoparticles having biocidal activity, such as those comprising zinc. Conventional disinfectant compounds may be included in the spray formulations and other fluid formulations as well, examples of which will be familiar to one having ordinary skill in the art. Additional details directed to a non-limiting mechanism by which metal nanoparticles are believed to provide biocidal activity are provided above.

NiO may be included as an additive in combination with metal nanoparticles in the disclosure herein. NiO is very efficient in producing ROS when present in small concentrations. NiO may be effective when included at, for example, about 0.5% to about 10% of the load of copper nanoparticles and/or silver nanoparticles as sub-micron particles separate and distinct from the copper nanoparticles and/or silver nanoparticles. At these loadings, NiO is very effective against certain bacteria, which may broaden the biocidal effectiveness of copper or silver. Bismuth, zinc, and tin oxides may be similarly effective at loadings of about 0.5% to about 10% of the mass of copper nanoparticles.

$TiO_2$ may be included as an additive in combination with metal nanoparticles in the disclosure herein. $TiO_2$ may catalyze the formation of hydroxyl radicals upon UV irradiation (e.g., in sunlight) when a protective covering of the present disclosure is located outdoors, for example. Atmospheric moisture may supply the source of water for producing the hydroxyl radicals by photooxidation. $TiO_2$ may be present at about 1% to about 25% of the load of copper nanoparticles and/or silver nanoparticles. The $TiO_2$ may likewise be present in the form of nanoparticles and/or micron-size particles (e.g., about 100 nm to about 5 microns).

Copper nanoparticles and/or silver nanoparticles, and NiO and/or $TiO_2$ may also be used in any combination with one another as well. $NiO_2$, $TiO_2$ and/or similar additives may also be present in creams, salves, ointments, gels and similar liquid formulations suitable for application to the skin. In addition to metal nanoparticles or metal nanoparticle agglomerates, creams, ointments, gels, salves and the like may comprise water, oils, emulsifiers, surfactants, thickening agents, buffers, or any combination thereof. Suitable additives for formulation of a cream, ointment, salve, gel, or similar formulation that is suitable for application to a skin surface will be familiar to one having ordinary skill in the art.

Cobalt compounds may also be combined with metal nanoparticle agglomerates, either alone or in combination with any of the foregoing additives. More specifically, cobalt (II) salts like halide, carbonate, sulfate, oxide (CoO), and the like may be present in combination with metal nanoparticle agglomerates in the disclosure herein. Cobalt ions may bind hypoxia inducible factor-1 alpha to create hypoxic conditions, which may induce VEGF expression and neovascularization to compensate for the low oxygen level, thereby accelerating blood vessel growth. Cobalt ions may be effective for this purpose when included at, for example, about 0.1% to about 10% of the load of copper nanoparticles and/or silver nanoparticles as sub-micron particles separate and distinct from the copper nanoparticles and/or silver nanoparticles.

As discussed above, metal nanoparticles may exhibit adherence to a variety of surfaces, such as through van der Waals adhesion and electrostatic interactions, which may be further supplemented through the high surface energy of the metal nanoparticles. In addition to metal nanoparticles, an adhesive suitable for promoting nanoparticle adherence to a given surface may be present. The adhesive may be applied with the metal nanoparticle agglomerates or already be present upon the base substrate. Both contact and non-contact adhesives may be employed for this purpose. Suitable adhesives will be familiar to one having ordinary skill in the art and include conventional epoxy adhesives, nitrile rubber adhesives, acrylic adhesives, cyanoacrylate adhesives, and the like. The adhesive may be present in the spray formulations or in a similar dip coating formulation in an amount sufficient to promote uniform application upon a surface, such as at a loading of 0.1 mg/in² to about 0.5 mg/in². Suitable loadings of the adhesive in the spray formulations may range from about 0.35 g adhesive/100 g spray formulation to about 2.75 g adhesive/100 g spray formulation. Coverage of the adhesive upon the face of the base substrate may range from about 50% to about 100% by area, or about 60% to about 90% by area, or about 75% to about 95% by area, or about 90% to about 99% by area. A layer thickness of the adhesive upon the face of the base substrate may be about 100 nm or less, or about 50 nm or less, such as about 1 nm to about 2 nm, or about 2 nm to about 5 nm, or about 5 nm to about 10 nm. In addition to promoting surface adherence, the adhesive may slow down the production of oxidized metal species, thereby affording a time-release activity profile of active metal from the metal nanoparticle agglomerates.

Particularly suitable adhesives may be biologically compatible adhesives such as octyl cyanoacrylate, 2-octyl cyanoacrylate, butyl cyanoacrylate, and isobutyl cyanoacrylate. Other examples of suitable adhesives having biocompatibility include, for example, polydioxanone, polyglycolic acid, polylactic acid, and polyglyconate. MAXON, a polyglycolide-trimethylene carbonate used a biodegradable suture adhesive, may represent a particular example.

After depositing a spray formulation or dip coating formulation upon the base substrate, the coverage of metal nanoparticles upon the surface of the base substrate may range from about 5% to about 75% by area. Thereafter, removal of the solvent and surfactants may take place, either at room temperature and atmospheric pressure, or with heating and optional application of vacuum. Solvent evaporation may take place in conjunction with metal nanoparticle deposition if the aerosolizable fluid medium is sufficiently volatile. Alternately, the aerosolizable fluid medium or similar liquid medium may be removed after metal nanoparticle deposition takes place. If tolerable to the base substrate, nanoparticle fusion (if occurring) and/or solvent removal may be accelerated by one or more of heating and application of vacuum. Heating may take place at any temperature from room temperature up to or beyond the fusion temperature of the metal nanoparticles, provided that the heating temperature is not so high that the base substrate experiences thermal damage. Thus, the metal nanoparticles may be fused or unfused when adhered to a base substrate. Moreover, the heating temperature need not necessarily exceed the normal boiling point or reduced pressure boiling point of the surfactants and solvent in order to promote their removal. Gentle heating well below the boiling point of the surfactant and solvent may be sufficient to promote their removal in many instances. In non-limiting embodiments, the heating may be conducted under flowing nitrogen or air or under vacuum to promote surfactant removal. Room temperature removal of organic solvents and/or surfactants may also be conducted. For example, heating may take place at a temperature of about 35° C. to about 65° C. in flowing nitrogen or air to promote removal of solvent and surfactant, thereby leaving unfused metal nanoparticles distributed upon the base substrate. Additional heating may be conducted thereafter, if desired, to promote nanoparticle fusion. In either case, after the surfactants are removed from the nanoparticle surface, robust adherence to the base substrate may be realized. When heating under higher temperatures, use of an inert atmosphere, such as nitrogen, may be desirable to limit degradation of a substrate and to control the amount of surface oxidation taking place upon the metal nanoparticles.

Once the surfactant has been removed from the metal nanoparticles (e.g., copper nanoparticles and/or silver nanoparticles or agglomerates thereof), the metal nanoparticles may undergo at least partial oxidation to form an oxide coating. The size of copper nanoparticles or agglomerates thereof may be selected such that at least some copper metal remains following oxidation, since a mixture of copper metal and oxidized copper may be beneficial for conveying antiseptic activity by inactivating one or more pathogens. Silver nanoparticles may similarly experience different amounts of surface oxidation depending upon the size of the silver nanoparticles and how they are processed. In non-limiting embodiments, following surfactant removal, copper nanoparticles may form a reaction product comprising about 25% to about 99% metallic copper by weight, about 0.5% to about 60% $Cu_2O$ by weight, and about 0.1% to about 20% CuO by weight. In more particular embodiments, the amount of metallic copper may be about 45% to about 90% by weight, or about 50% to about 70% by weight, or about 80% to about 98% by weight, and the amount of $Cu_2O$ may about 10% by weight or less, such as about 0.1% to about 10% by weight or less or about 5% to about 10% by weight or less, and the amount of CuO may be about 1% by weight or less, such as about 0.1% to about 1% by weight or about 0.5% to about 1% by weight. The $Cu_2O$ and CuO may form a shell or partial shell upon the metal nanoparticles or agglomerates thereof that is about 1 nm or greater in thickness, or about 10 nm or greater in thickness, or even about 100 nm or greater in thickness, such as about 10 nm to about 100 nm thick in many instances.

Silver nanoparticles adhered to the base substrate may similarly comprise about 25% to about 99% metallic silver by weight and the balance being $Ag_2O$. The $Ag_2O$ may similarly be present in a shell having a thickness of about 10 nm or greater, such as about 100 nm to about 3 microns thick.

Accordingly, methods of the present disclosure may comprise providing an antiseptic substrate comprising a base substrate having metal nanoparticle agglomerates adhered thereto, and contacting the metal nanoparticles with a skin penetration, a skin injury, a burn, a site to be subjected to a skin penetration, or an active skin infection to provide infection control thereto against at least one infective agent. The at least one infective agent may comprise at least one virus, bacterium, or any combination thereof. Examples of viruses and bacteria that may be inactivated through the disclosure herein are provided below.

Alternately, an antiseptic fluid formulation comprising a fluid medium having metal nanoparticle agglomerates dispersed therein may be provided for promoting infection control up on a skin surface. The antiseptic formulations may be contacted with a skin penetration, a skin injury, a burn, a site to be subjected to a skin penetration, or an active skin infection to provide infection control against at least one infective agent. Suitable fluid forms include solutions and suspensions, including creams, ointments, salves, gels, or the like that are rubbed on a skin surface, or liquid solutions or suspensions of metal nanoparticle agglomerates that may be sprayed, poured, or rubbed on a skin surface.

Bacteria and viruses that may be mitigated at a site of potential infection, such as a skin penetration, burn or the like, are not considered to be particularly limited. In the therapeutic realm, metal nanoparticle agglomerates may be particularly effective against viruses and bacteria presenting their symptoms of infection upon the skin. Illustrative examples include viruses such as rubella, measles, small pox, roseola, chicken pox (varicella), shingles, hepatitis, polio, mumps, human papilloma viruses (HPV), including those producing genital or non-genital warts, herpes, cold sore viruses, fifth disease, chikungunya, and similar exanthematous viruses, any of which may be effectively managed through the disclosure herein. Skin lesions associated with human immunodeficiency virus (HIV) may also be treated through the disclosure herein. Cutaneous viral diseases causing lesions or pustules upon the skin may be managed similarly through contact thereof with metal nanoparticle agglomerates in a suitable form. Skin lesions associated with venereal diseases such as gonorrhea, syphilis and chlamydia may also be treated through use of the disclosure herein. Use of metal nanoparticle agglomerates may lessen the severity or recurrence of cutaneous viral diseases which tend to produce long-lived skin blemishes and recur with varying regularity.

Bacterial infections such as topical strep, staph infections and acne, for example, may be managed through contact with metal nanoparticle agglomerates according to the disclosure herein. Gangrene is also bacterial in origin and also may be treated similarly. Other bacteria or bacterial infections that may be managed through the disclosure herein include, for example, *Staphylococcus* and *Streptococcus* infections, salmonella, cellulitis, folliculitis, impetigo, respiratory infections, and urinary tract infections. Acne creams, gels, ointments, and the like comprising metal nanoparticle agglomerates, including those formulated with conventional acne medications, may promote clearing of acne blemishes through multiple treatment mechanisms. Skin creams comprising metal nanoparticle agglomerates may aid in removing scars or wrinkles by promoting vascularization and tightening skin.

Antifungal creams, such as those suitable for treating athlete's foot, may also be similarly formulated and used according to the disclosure herein. Treatments for dandruff and seborrheic dermatitis, such as shampoos, conditioners, and the like containing metal nanoparticle agglomerates, may also be formulated. Creams and ointments for treating yeast-like fungi such as Malassezia may also be formulated according to the disclosure herein.

Antiseptic fluid formulations comprising metal nanoparticle agglomerates may also be adapted for oral use to prevent or mitigate oral infections. Formulations comprising metal nanoparticles suitable for oral use may include, for example, mouthwashes and other oral rinses, toothpaste, and the like. Similarly, metal nanoparticle agglomerates may be incorporated upon a toothbrush, such as upon the bristles of the toothbrush, or upon dental floss to aid in limiting oral infections and/or to promote healing from an oral infection.

Antiseptic fluid formulations containing metal nanoparticle agglomerates may also be used within the ear canal for addressing ear infections.

Antiseptic substrates of the present disclosure having metal nanoparticle agglomerates incorporated thereon may also be used for limiting exposure to orally ingested infectious agents as well. In particular, antiseptic substrates of the present disclosure or a filter or filtration system employing an antiseptic substrate of the present disclosure may be employed for disinfecting water, such as in a remote site (e.g., during camping) or as a supplement when ordinary water purification processes have failed (e.g., following a natural disaster or due to equipment failure). For batchwise water purification, a piece of antiseptic substrate may be contacted with a quantity of water for a period of time and then the water may be used for drinking or cooking, for example. In a non-limiting example, a piece of antiseptic substrate containing about 2-4 mg of copper may be utilized to treat about 1 liter of water. Exposure of the antiseptic substrate to the water may take place for about 1 hour or less, or about 30 minutes or less, or about 10 minutes or less, or about 5 minutes or less. Larger quantities of water may be treated by employing correspondingly larger amounts of antiseptic substrate and/or metal nanoparticle agglomerates thereon. Flow through filters and/or water filtration systems employing an antiseptic substrate of the present disclosure may be employed to treat still larger quantities of water still.

Accordingly, water purification methods of the present disclosure may comprise providing an antiseptic substrate comprising a base substrate having metal nanoparticle agglomerates adhered thereto; contact the metal nanoparticle agglomerates with water containing at least one infective agent; and inactivating at least a portion of the at least one infective agent with the metal nanoparticle agglomerates. Any of the antiseptic substrates and metal nanoparticle agglomerates disclosed herein may be utilized in this regard. Further, water purification methods of the present disclosure may be used in combination with, including simultaneously with, other water filtration or purification techniques that remove contaminants such as heavy metals and other toxic inorganic compounds.

Water-borne bacterial infective agents that may be inactivated through water processing according to the disclosure herein include, for example, botulism, camplyobacteriosis, cholera, *E. coil*, mycobacterium, shigella, salmonella, and the like. Water-borne viral infective agents that may be inactivated in accordance with the disclosure herein include, for example, hepatitis, norovirus, polio, and the like.

Embodiments disclosed herein include:

A. Methods for infection control with antiseptic substrates. The methods comprise: providing an antiseptic substrate comprising a base substrate having metal nanoparticles or metal nanoparticle agglomerates adhered thereto; and contacting the metal nanoparticles with a skin penetration, a skin injury, a site to be subjected to a skin penetration, or an active skin infection to provide infection control against at least one virus, bacterium, or any combination thereof.

B. Methods for infection control with liquid antiseptic formulations. The methods comprise: providing an antiseptic formulation comprising a fluid medium having metal nanoparticles or metal nanoparticle agglomerates dispersed therein; and contacting the metal nanoparticles with a skin penetration, skin injury, a site to be subjected to a skin penetration, or an active skin infection to provide infection control against at least one virus, bacterium, or any combination thereof.

C. Methods for water purification using substrate-bound metal nanoparticles or agglomerates thereof. The methods comprise: providing an antiseptic substrate comprising a base substrate having metal nanoparticles or metal nanoparticle agglomerates adhered thereto; contacting the metal nanoparticles or metal nanoparticle agglomerates with water containing at least one virus, bacterium, or any combination thereof; and inactivating at least a portion of the at least one virus, bacterium, or any combination thereof with the metal nanoparticles or metal nanoparticle agglomerates.

D. Antiseptic media comprising metal nanoparticles or agglomerates thereof. The antiseptic media may comprise creams, salves, gels, oral rinses, wet wipes, dry wipes, liquid bandages, or spray bandages.

Each of embodiments A-D may have one or more of the following additional elements in any combination:

Element 1: wherein the metal nanoparticles comprise copper nanoparticles, silver nanoparticles, agglomerates thereof, or any combination thereof.

Element 2: wherein the base substrate comprises a material selected from the group consisting of a polymer, a textile, paper, cardboard, or any combination thereof.

Element 3: wherein the base substrate is in a form of a fabric, tape, sheet, or any combination thereof.

Element 4: wherein the metal nanoparticles cover about 5% to about 95% of the base substrate by area and at a coverage of about 1 mg/in$^2$ to about 2 mg/in$^2$ or about 0.5 mg/in$^2$ to about 3 mg/in$^2$.

Element 5: wherein an adhesive is applied to the base substrate with the metal nanoparticles or an adhesive is present when the metal nanoparticles are applied to the base substrate.

Element 6: wherein the base substrate is a polymer substrate and the metal nanoparticles or agglomerates thereof are at least partially embedded in the polymer substrate.

Element 7: wherein the antiseptic formulation is a liquid that is sprayed, poured or rubbed upon the skin.

Element 8: wherein the antiseptic formulation is a cream, salve, or gel that is rubbed upon the skin.

Element 9: wherein the antiseptic substrate is present in a filter or filtration system.

By way of non-limiting example, exemplary combinations applicable to A-D include, but are not limited to: 1 and 2; 1 and 4; 1 and 5; 1 and 6; 4 and 5; 4 and 6; 1 and 7; 1 and 8; 4 and 9; and 5 and 9.

By way of further non-limiting example, embodiments disclosed herein include:

A'. Methods for infection control with antiseptic substrates. The methods comprise: providing an antiseptic substrate comprising a base substrate having metal nanoparticle agglomerates adhered thereto; and contacting the metal nanoparticle agglomerates with a skin penetration, a skin injury, a burn, a site to be subjected to a skin penetration, or an active skin infection to provide infection control thereto against at least one infective agent.

B'. Methods for infection control with liquid antiseptic formulations. The methods comprise: providing an antiseptic fluid formulation comprising a fluid medium having metal nanoparticle agglomerates dispersed therein; and contacting the metal nanoparticle agglomerates with a skin penetration, a skin injury, a burn, a site to be subjected to a skin penetration, or an active skin infection to provide infection control thereto against at least one infective agent.

C'. Methods for water purification using substrate-bound metal nanoparticle agglomerates. The methods comprise: providing an antiseptic substrate comprising a base substrate having metal nanoparticle agglomerates adhered thereto; contacting the metal nanoparticle agglomerates with water containing at least one infective agent; and inactivating at least a portion of the at least one infective agent with the metal nanoparticle agglomerates.

D'. Methods for inactivating at least one infective agent with metal nanoparticle agglomerates. The methods comprise: contacting a plurality of metal nanoparticle agglomerates with a skin surface; and inactivating at least one infective agent with the metal nanoparticle agglomerates while contacting the skin surface.

E'. Antiseptic fluid formulations comprising metal nanoparticle agglomerates. The antiseptic fluid formulations may comprise a fluid medium; and metal nanoparticle agglomerates dispersed in the fluid medium; wherein the fluid medium is a cream, ointment, salve, gel, liquid, or liquid suspension suitable for contacting a skin surface or for oral use.

E1': An oral rinse comprising the antiseptic fluid formulation of E'.

E2': A toothpaste comprising the antiseptic fluid formulation of E'.

E3': A liquid bandage comprising the antiseptic fluid formulation of E', optionally wherein the antiseptic fluid formulation is sprayable.

Each of embodiments A'-D' may have one or more of the following additional elements in any combination:

Element 1': wherein the at least one infective agent comprises at least one virus, bacterium, or any combination thereof.

Element 2': wherein the metal nanoparticle agglomerates comprise copper nanoparticles, silver nanoparticles, or any combination thereof.

Element 3': wherein the metal nanoparticle agglomerates further comprise NiO, ZnO, TiO$_2$, a cobalt salt, or any combination thereof.

Element 4': wherein the base substrate comprises a material selected from the group consisting of a polymer, a textile, paper, cardboard, or any combination thereof.

Element 5': wherein the base substrate is in a form of a fabric, tape, sheet, or any combination thereof.

Element 6': wherein the metal nanoparticle agglomerates cover about 5% to about 95% of the base substrate by area and at a coverage density of about 0.5 mg/in$^2$ to about 3 mg/in$^2$.

Element 7': wherein the metal nanoparticle agglomerates are adhered to the base substrate via an adhesive layer.

Element 8': wherein the base substrate is a polymer substrate and the metal nanoparticle agglomerates are at least partially embedded in the polymer substrate.

Element 9': wherein the metal nanoparticle agglomerates comprise metal nanoparticles, in which at least a majority of the metal nanoparticles range from about 50 nm to about 250 nm in size.

Element 10': wherein the metal nanoparticle agglomerates range from about 1 micron to about 35 microns in size.

Element 11': wherein the antiseptic fluid formulation is a liquid or liquid suspension that is sprayed, poured or rubbed upon a skin surface.

Element 12': wherein the antiseptic fluid formulation is a cream, ointment, balm, salve, or gel that is rubbed upon a skin surface.

Element 13': wherein the antiseptic substrate is present in a filter or filtration system.

Element 14': wherein the water is flowed through the antiseptic substrate.

Element 15': wherein the skin surface has a skin penetration, a skin injury, a burn, a site to be subjected to a skin penetration, or an active skin infection.

Element 16': wherein the metal nanoparticle agglomerates are adhered to a base substrate.

Element 17': wherein the metal nanoparticle agglomerates are dispersed in a fluid medium.

By way of non-limiting example, exemplary combinations applicable to A'-E', E1', E2' and E3' include, but are not limited to: 1' and 2'; 1' and 3'; 1' and 9'; 1' and 10'; 2' and 3'; 2' and 9'; 2' and 10'; 3' and 9'; 3' and 10'; 9' and 10'; 1' and 4'; 1' and 5'; 1' and 6'; 1' and 7'; 1' and 8'; 1' and 11'; 1' and 12'; 1' and 13'; 1' and 14'; 1' and 15'; 1' and 16'; 2' and 4'; 2' and 5'; 2' and 6'; 2' and 7'; 2' and 8'; 2' and 11'; 2' and 12'; 2' and 13'; 2' and 14'; 2' and 15'; 2' and 16'; 3' and 4'; 3' and 5'; 3' and 6'; 3' and 7'; 3' and 8'; 3' and 11'; 3' and 12'; 3' and 13'; 3' and 14'; 3' and 15'; 3' and 16'; 9' and 4'; 9' and 5'; 9' and 6'; 9' and 7'; 9' and 8'; 9' and 11'; 9' and 12'; 9' and 13'; 9' and 14'; 9' and 15'; 9' and 16'; 10' and 4'; 10' and 5'; 10' and 6'; 10' and 7'; 10' and 8'; 10' and 11'; 10' and 12'; 10' and 13'; 10' and 14'; 10' and 15'; 10' and 16'; 4' and 6'; 4' and 7'; 4' and 8'; 5' and 6'; 5' and 7'; and 5' and 8'.

To facilitate a better understanding of the present disclosure, the following examples of preferred or representative embodiments are given. In no way should the following examples be read to limit, or to define, the scope of the invention.

EXAMPLES

Agglomerates of copper nanoparticles in the 50-250 nm size range with a monolayer of amine surfactants on their surfaces and having an agglomerate size of 1-35 microns were adhered to a 55/45 cellulose/polyester fabric blend with an average fiber diameter of about 10 microns using an epoxy adhesive. This may be done via spray coating a suitable ink or dye formulation onto the fibers, or dip coating or gravure coating via a commercial process. The adhesive layer was about 20-50 nm thick, and the metal nanoparticle agglomerates were partially embedded in the adhesive layer with a substantial portion still exposed. The areal coverage of the agglomerates upon the fiber surfaces was about 20-50%. The copper loading upon the fabric ranged from about 1.2 mg/in$^2$ to about 2.7 mg/in$^2$. Depending on size, some of the agglomerates may have the surfactant layer partially removed, thereby resulting in partial oxidation and an overall mixture of copper metal, Cu$_2$O and CuO species on the fiber surface. The copper metal to oxide ratio may reside in the 1-10% range. Over time, oxidation and dissolution progressively result in fading of the initial dark brown-red color to more light yellow-green. FIG. 7 shows an illustrative photographic image of a fabric having agglomerates of copper nanoparticles adhered thereto, as fabricated (left side of image) and after extended use (right side of image). The nanoparticle-loaded fabric was then subjected to various stability and toxicological tests specified below.

Agglomerates of copper nanoparticles in the 20-150 nm size range with a partially removed monolayer of amine surfactants on their surfaces and having an agglomerate size of 5-15 microns were adhered to a 30/70 cellulose/polyester fabric blend with an average fiber diameter of about 10 microns using an epoxy adhesive. This may be done via spray coating a suitable ink or dye formulation onto the fibers, or dip coating or gravure coating via a commercial process. The adhesive layer was about 50-100 nm thick and the metal nanoparticle agglomerates were partially embedded in the adhesive layer with a substantial portion still exposed. The areal coverage of the agglomerates upon the fiber surfaces was about 30-70%. The copper loading upon the fabric ranged from about 2.3 mg/in$^2$ to about 4.5 mg/in$^2$. Depending on size, some of the agglomerates may be fully or partially oxidized, thereby resulting in an overall mixture of copper metal, Cu$_2$O and CuO species on the fiber surface. The copper metal to oxide ratio may reside in the 5-25% range.

Agglomerates of copper nanoparticles in the 50-250 nm size range with a monolayer of amine surfactants on their surfaces and having an agglomerate size of 1-35 microns were adhered to a 55/45 cellulose/polyester fabric blend with an average fiber diameter of about 10 microns using a styrene acrylic acid block copolymer adhesive. This may be done via spray coating a suitable ink or dye formulation onto the fibers, or dip coating or gravure coating via a commercial process. The adhesive layer was about 100-250 nm thick, and the metal nanoparticle agglomerates were partially embedded in the adhesive layer with a substantial portion still exposed. The areal coverage of the agglomerates upon the fiber surfaces was about 10-35%. The copper loading upon the fabric ranged from about 1.7 mg/in$^2$ to about 3.5 mg/in$^2$. Depending on size, some of the agglomerates may be fully or partially oxidized, thereby resulting in an overall mixture of copper metal, Cu$_2$O and CuO species on the fiber fabric surface. The copper metal to oxide ratio may reside in the 5-15% range.

Agglomerates of copper nanoparticles in the 50-200 nm size range with a monolayer of amine surfactants on their surfaces and having an agglomerate size of 1-35 microns were adhered to a 100% polypropylene fabric (melt-blown) with an average fiber diameter of about 10 microns using an epoxy adhesive. This may be done via spray coating a suitable ink or dye formulation onto the fibers, or dip coating or gravure coating via a commercial process. The adhesive layer was about 35-150 nm thick, and the metal nanoparticle agglomerates were partially embedded in the adhesive layer with a substantial portion still exposed. The areal coverage of the agglomerates on the fiber surfaces was about 5-30%. The copper loading upon the fabric ranged from about 0.7 mg/in$^2$ to about 1.6 mg/in$^2$. Depending on size, some of the agglomerates may be fully or partially oxidized, thereby resulting in an overall mixture of copper metal, Cu$_2$O and CuO species on the fiber surface. The copper metal to oxide ratio may reside in the 1-5% range.

Agglomerates of copper nanoparticles in the 35-200 nm size range with a monolayer of amine surfactants on their surfaces and having an agglomerate size of 3-25 microns were adhered to a 100% cotton fabric with an average fiber diameter of about 10 microns using a styrene acrylic acid block copolymer adhesive. This may be done via spray coating a suitable ink or dye formulation onto the fibers, or dip coating or gravure coating via a commercial process. The adhesive layer was about 50-150 nm thick, and the metal nanoparticle agglomerates were partially embedded in the adhesive layer with a substantial portion still exposed. The areal coverage of the agglomerates upon the fiber surfaces was about 40-75%. The copper loading upon the fabric ranged from about 2.7 mg/in$^2$ to about 4.5 mg/in$^2$. Depending on size, some of the agglomerates may be fully or partially oxidized, thereby resulting in an overall mixture of copper metal, Cu$_2$O and CuO species on the fiber surface. The copper metal to oxide ratio may be in the 3-25% range.

When the foregoing fabrics were utilized as dry wipes for disinfection of a hard surface, wiping the hard surface for just 5 seconds may result in full sterilization of a wide range of microbes, viruses and bacteria. Depending on the frequency of use, such dry wipes may remain effective for up to about 30 days. After use, the dry wipes may self-sterilize (e.g., in about 5 minutes or less) for frequent and rapid reuse. Since the pathogens are killed or inactivated upon contact, transfer and cross-contamination is unlikely to occur.

Stability testing. A 6"×6" sheet of fabric was tumbled in water for 8 hours. Only 1.4% of the available copper by weight (0.54 mg) was released into the water.

Shedding was also determined by exposing the fabric to simulated breathing conditions (8.4 and 40.8 m/min face velocity gas flow) and analyzing a filter trap for liberated copper by SEM or EDS. The shedding tests did not reveal detectable liberation of copper from the fabric.

VOCs. No volatile organic compounds (VOCs) from a battery of 70 standard VOCs were detected as being released from the fabric when tested under standard conditions.

Direct exposure to cell growth media. A piece of fabric was first soaked in supplemented cell growth media for up to an hour and then removed. Thereafter, Vero cells or Calu-3 lung epithelial cells were immersed in the cell growth media and incubated overnight in a $CO_2$ incubator. Cell viability was determined by assessing ATP production using a luminescence assy. The luminescence assay did not reveal a substantial change in cell viability.

Efficacy. Efficacy of the fabric against a panel of bacterial and viral pathogens was tested. The panel included gram-positive, gram-negative, and antibiotic-resistant bacteria, bacteriophages as representatives of non-enveloped viruses, enveloped viruses such as H1N1 flu, H3N2 flu, and SARS-CoV-2, and non-enveloped viruses such as feline calicivirus. In all cases, >99% kill rates were observed within 30 seconds, and full efficacy was maintained over 15 days of repeated daily exposure. The efficacy was >99.9% over a standard EPA exposure time of 2 hours against *Staphylococcus aureus* (ATCC 6538), *Enterobacter aerogenes* (ATCC 13048), *Pseudomonas aeruginosa* (ATCC 15442), Methicillin Resistant *Staphylococcus aureus* MRSA (ATCC 33592), and *Escherichia coil* 0157:H7 (ATCC 35150). The fabric maintained substantially 100% of the original efficacy against repeated viral inoculations (27M PFUs; H1N1, H3N2 and feline calicivirus) or bacterial loads introduced to the fabric over the course of 30 days. The fabric maintained >99.9% efficacy against *Staphylococcus aureus* and *Klebsiella aerogenes* after months of daily high-touch use and moisture exposure with visible wear. An inactivation rate of substantially 100% was realized against human wound pathogens such as *Acinetobacter baumannii, Klebsiella pneumonia, Pseudomonas aeruginosa, Enterococcus faecalis*, Methicillin-resistant *Staphylococcus aureus* (MRSA), and *Staphylococcus epidermidis* over 24 hours.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the features of the present disclosure are presented herein. Not all features of a physical implementation are described or shown in this application for the sake of clarity. It is understood that in the development of a physical embodiment incorporating the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The disclosure herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   providing a base substrate;
   applying an adhesive layer having a thickness of about 100 nm or less to the base substrate;
   adhering metal nanoparticle agglomerates to the adhesive layer, wherein the metal nanoparticle agglomerates are partially embedded in the adhesive layer with a portion of the metal nanoparticle agglomerates exposed;
   wherein the metal nanoparticle agglomerates comprise copper nanoparticles, wherein at least 80% or more of the copper nanoparticles range from about 50 nm to about 250 nm in size, and wherein the metal nanoparticle agglomerates are oxidized to form a reaction product comprising metallic copper, $Cu_2O$ and $CuO$ species; and
   contacting the metal nanoparticle agglomerates with a skin injection site, a skin injury, a burn, a site to be subjected to a skin injection, or an active skin infection to provide infection control thereto against at least one infective agent;
   wherein the adhesive layer slows down the production of oxidized metal species, thereby providing a time release profile of active metal from the metal nanoparticle agglomerates.

2. The method of claim 1, wherein the at least one infective agent comprises at least one virus, bacterium, or any combination thereof.

3. The method of claim 1, wherein the metal nanoparticle agglomerates also comprise silver nanoparticles.

4. The method of claim 1, wherein the metal nanoparticle agglomerates cover about 5% to about 95% of the base substrate by area and at a coverage density of about 0.5 $mg/in^2$ to about 3 $mg/in^2$.

5. The method of claim 1, wherein the base substrate is a polymer substrate and the metal nanoparticle agglomerates are at least partially embedded in the polymer substrate.

6. The method of claim 1, wherein the metal nanoparticle agglomerates range from about 1 micron to about 35 microns in size.

7. The method of claim 1, wherein the reaction product comprises about 25 wt. % to about 99 wt. % metallic copper, about 0.5 wt. % to about 60 wt. %. $Cu_2O$, and about 0.1 wt. % to about 20 wt. % CuO.

8. The method of claim 1, wherein the adhesive is selected from the group consisting of epoxy adhesives, nitrile rubber adhesives, acrylic adhesives, cyanoacrylate adhesives, polydioxanone, polyglycolic acid, polylactic acid, and polyglyconate.

9. The method of claim 8, wherein the adhesive is a biologically compatible adhesive selected from the group consisting of octyl cyanoacrylate, 2-octyl cyanoacrylate, butyl cyanoacrylate, and isobutyl cyanoacrylate.

10. The method of claim 1, wherein metal nanoparticle agglomerates comprise an additive selected from the group consisting of NiO, ZnO, $TiO_2$, a cobalt compound or any combination thereof.

11. A method comprising:
providing a base substrate;
applying an adhesive layer having a thickness of about 100 nm or less to the base substrate;
adhering metal nanoparticle agglomerates to the adhesive layer, wherein the metal nanoparticle agglomerates are partially embedded in the adhesive layer with a portion of the metal nanoparticle agglomerates exposed;
wherein the metal nanoparticle agglomerates comprise copper nanoparticles, and
contacting the metal nanoparticle agglomerates with a skin injection site, a skin injury, a burn, a site to be subjected to a skin injection, or an active skin infection to provide infection control thereto against at least one infective agent,
wherein at least 90% of the copper nanoparticles range from about 50 nm to about 250 nm in size;
wherein the metal nanoparticle agglomerates comprising the copper nanoparticles cover about 5% to about 95% of the base substrate by area and at a coverage density of about 0.5 mg/in$^2$ to about 3 mg/in$^2$; and
wherein the adhesive layer slows down the production of oxidized metal species, thereby providing a time release profile of active metal from the metal nanoparticle agglomerates.

12. The method of claim 1, wherein the copper nanoparticles are spherical.

13. The method of claim 1, wherein the copper nanoparticles range from about 100 nm to about 250 nm in size.

14. The method of claim 13, wherein the metal nanoparticle agglomerates comprise at least one of metal nanowires and 10 to 50 nm platelets.

* * * * *